(12) United States Patent
Jang et al.

(10) Patent No.: US 8,179,698 B2
(45) Date of Patent: May 15, 2012

(54) POWER CONVERTER SYSTEM THAT OPERATES EFFICIENTLY OVER A RANGE OF LOAD CONDITIONS

(75) Inventors: Yungtaek Jang, Cary, NC (US); Milan M. Jovanović, Cary, NC (US); Bruce C. H. Cheng, Taipei (TW)

(73) Assignee: Delta Electronics, Inc., Neihu (TW)

( * ) Notice: Subject to any disclaimer, the term of this patent is extended or adjusted under 35 U.S.C. 154(b) by 557 days.

(21) Appl. No.: 12/410,002

(22) Filed: Mar. 24, 2009

(65) Prior Publication Data
US 2009/0244944 A1 Oct. 1, 2009

Related U.S. Application Data

(60) Provisional application No. 61/064,756, filed on Mar. 25, 2008.

(51) Int. Cl.
H02M 3/335 (2006.01)
(52) U.S. Cl. .......................................... 363/17; 363/65
(58) Field of Classification Search .................. 363/17, 363/24, 34, 37, 39, 65, 71, 123, 131, 132; 307/44–46, 48, 64, 66, 80
See application file for complete search history.

(56) References Cited

U.S. PATENT DOCUMENTS

| 4,860,185 A | | 8/1989 | Brewer et al. | |
|---|---|---|---|---|
| 5,289,361 A | | 2/1994 | Vinciarelli | |
| 5,302,858 A | * | 4/1994 | Folts | 307/66 |
| 5,519,261 A | * | 5/1996 | Stewart | 307/87 |
| 5,532,524 A | * | 7/1996 | Townsley et al. | 307/64 |
| 5,777,858 A | * | 7/1998 | Rodulfo | 363/24 |
| 5,867,377 A | | 2/1999 | Suranyi | |
| 6,058,030 A | * | 5/2000 | Hawkes et al. | 363/65 |
| 6,353,304 B1 | | 3/2002 | Atcitty et al. | |
| 6,459,175 B1 | | 10/2002 | Potega | |
| 6,462,507 B2 | | 10/2002 | Fisher, Jr. | |
| 6,674,274 B2 | | 1/2004 | Hobrecht et al. | |
| 6,795,322 B2 | | 9/2004 | Aihara et al. | |
| 6,992,902 B2 | * | 1/2006 | Jang et al. | 363/17 |
| 7,414,869 B2 | * | 8/2008 | Nakahori | 363/71 |
| 7,880,334 B2 | * | 2/2011 | Evans et al. | 307/66 |
| 7,911,810 B2 | * | 3/2011 | Shimada et al. | 363/17 |
| 7,948,118 B2 | * | 5/2011 | Chambon | 307/66 |
| 7,948,778 B2 | * | 5/2011 | Pfitzer et al. | 363/34 |
| 7,986,122 B2 | * | 7/2011 | Fornage et al. | 320/101 |
| 8,004,867 B2 | * | 8/2011 | Nakahori | 363/56.05 |
| 2008/0030078 A1 | | 2/2008 | Whitted et al. | |

OTHER PUBLICATIONS

Notification of Transmittal of International Preliminary Report on Patentability (PCT/IPEA/416) and International Preliminary Report on Patentability (PCT/IPEA/409) issued in International Application No. PCT/US09/38102 on Sep. 30, 2010.
Chen, J., "Determine Buck Converter Efficiency in PFM Mode," Power Electronics Technology, Sep. 2007, pp. 28-33.

(Continued)

*Primary Examiner* — Adolf Berhane
(74) *Attorney, Agent, or Firm* — Venable LLP; Robert S. Babayi; Christopher Ma

(57) ABSTRACT

A power converter system supplies power to one or more loads. The power converter system comprises at least one power converter operating at a desired efficiency; and a power storage system coupled to the at least one power converter for receiving power supplied from the at least one power converter and storing power therein when the at least one power converter operates at an efficiency that is below the desired efficiency.

19 Claims, 48 Drawing Sheets

OTHER PUBLICATIONS

Choi, J-H. at al., "The Improved Burst Mode in the Stand-by Operation of Power Supply," Nineteenth Annual IEEE, vol. 1, 2004, pp. 426-432.

Fang, Y., at al., "Standby Mode Control Circuit Design of LLC Resonant Converter," IEEE 2007, pp. 726-730.

Mulligan, M.D. at al., "A Constant-Frequency Method for Improving Light-Load Efficiency in Synchronous Buck Converters," IEEE Power Electronics Letters, vol. 3, No. 1, Mar. 2005, pp. 24-29.

Wang, X., et al., "High Efficiency High Power Density DC/DC Converter with Wide Input Range," IEEE, vol. 5, Oct. 8-12, 2006, pp. 2115-2120.

International Search Report and Written Opinion dated May 27, 2009, issued in corresponding Int'l Application No. PCT/US2009/038102.

* cited by examiner

US 8,179,698 B2

POWER CONVERTER SYSTEM THAT OPERATES EFFICIENTLY OVER A RANGE OF LOAD CONDITIONS

FIELD OF THE INVENTION

This invention relates to methods of designing and operating power converters so that their efficiency is optimized over the entire load range.

DESCRIPTION OF THE PRIOR ART

Ever since the start of the miniaturization era spurred on by the microelectronics revolution in the late fifties and early sixties, power conversion equipment employed in electronics equipment and systems has been facing continuously increasing power density and efficiency challenges. Until recently, efficiency increases of power conversion circuits were primarily driven by increased power density requirements since power density increases are only possible if appropriate incremental improvements in full-load efficiency are achieved so that the thermal performance is not adversely affected. As a result, maximization of the full-load efficiency has been a design focus all along. However, in the early nineties, the explosive growth of consumer electronics and data-processing equipment had prompted the introduction of various, mostly voluntary, requirements aimed at minimizing the idle-mode, i.e., light-load, power consumption. Most notable light-load efficiency requirements are defined in U.S. Energy Star and ECoC (European Code of Conduct) specifications.

Today, the power supply industry is at the beginning of another major focus shift that puts efficiency improvements across the entire load range in the forefront of customers' performance requirements. This focus on efficiency has been prompted by economic reasons and environmental concerns caused by the continuous, aggressive growth of the Internet infrastructure and a relatively low energy efficiency of its power converter system. In fact, the environmental concerns have prompted Environmental Protection Agency (EPA) to revise its Energy Star specifications for power supply efficiencies by defining the minimum efficiencies from full load down to 20% of full load. However, major computer, telecom, and network-equipment manufactures already require light-load efficiencies that exceed the latest Energy Star specifications and also are extending these requirements down to 10% and, even 5% loads.

Generally, the efficiency of power conversion circuits at heavy loads is determined by conduction losses of semiconductor and magnetic components, whereas their light-load efficiency is primarily determined by switching losses of semiconductors, core losses of magnetic material, and drive losses of semiconductor switches, as disclosed by M. D. Mulligan, B. Broach, T. H. Lee, "A constant-frequency method for improving light-load efficiency in synchronous buck converters", IEEE Power Electronics Letters, Volume 3, Issue 1, March 2005, pp. 24-29. Because switching and drive losses of semiconductor switches and core losses of magnetic components are almost independent of the load current, a typical efficiency curve as a function of the load current shows a steep fall off as the load current decreases beyond 20-30% of the full load current. In fact, in a typical power converter, the light load efficiency, e.g., efficiency at 10%, is significantly lower than that at full load. This difference increases as the rated output current (power) of converter increases because higher power requires the use of larger semiconductor devices (or more devices in parallel) and larger magnetic cores which inherently exhibit increased switching and core losses, respectively.

Generally, the minimization of the conduction losses, i.e., the full-load efficiency optimization, requires maximization of the silicon area and minimization of the resistance of copper conductors. Specifically, the minimization of the semiconductor conduction loss calls for selection of MOSFETs with minimum on-resistances and rectifiers with minimum forward voltage drops, whereas the conduction loss of magnetic components such as input- and output-filter inductors, transformers, and interconnect losses are minimized by reducing the resistance of copper conductors, i.e., by shortening the length and increasing the cross-section of wires and PCB traces. The minimization of core losses of magnetic components, switching losses of semiconductors, and drive losses is based on the selection of optimal switching frequency and the use of low-loss magnetic materials, MOSFET switches with inherently lower switching losses, and rectifiers with a low reverse-recovered charge and/or by employing various soft-switching techniques that substantially reduce switching losses of semiconductors, as disclosed by X. wang, F. Tian, Y. Li, I. Batarseh, "High Efficiency high Power Density DC/DC Converter with Wide Input Range", in Proc. IAS Annual Meeting, pp. 2115-2120, October 2006.

However, very often, the described efficiency optimization techniques may not be enough to make the power supply exhibit the efficiency curve that meets customer's expectations. This is especially true for ac/dc (off-line) power supplies intended for high-power applications. In this case, it is a common practice to resort to power-supply-level power management techniques to further improve partial-load efficiencies. Generally, these techniques are based on changing operation mode based on the load current and/or input voltage conditions. The most used power management techniques practiced today are variable switching frequency control, bulk-voltage reduction technique, phase-shedding technique, and "burst"-mode operation technique. While all these load-activity-based power management techniques have been implemented using analog technology, the current rapid employment of digital technology in power conversion applications has made their implementation much easier.

In the variable-switching-frequency approach, the switching frequency of a converter is reduced as the load current reduces, as disclosed by Jingdong Chen, "Determine Buck Converter Efficiency in PFM Mode", Power Electronics Technology, September 2007, pp. 28-33. Because the switching loses is proportional with the switching frequency this method improves the light load efficiency. In its simplest implementation, the switching frequency is not continuously reduced as the load gets lighter, but it is only switched to a lower fixed frequency when the load current falls below the preset threshold level.

In off-line converters that require active power-factor-correction (PFC) front-end, reduction of energy-storage (bulk) voltage has been extensively used to improve the light load efficiency, as disclosed by P. Vinciarelli in U.S. Pat. No. 5,289,361. This method is based on the fact that the switching losses in semiconductor components such as MOSFET switches and fast-recovery diode rectifiers are reduced if the voltage that they need to switch off is reduced. In a typical universal-line (90-264 $V_{rms}$) ac/dc power supply with a PFC front end, the bulk voltage is set slightly above the peak of the maximum line voltage, i.e., at around 400 V, and the bulk capacitor value is determined so that the bulk cap can support the full power for a specified hold-up time, which is usually in the 12-ms to 20-ms range. Since at a partial load the bulk-cap energy required to support the output during the hold-up time can be stored at a lower voltage, the bulk cap voltage can be reduced as the load decreases to improve the light-load efficiency. The range of the bulk voltage is limited by the regulation-range of the downstream dc/dc output stage.

In power converters that are implemented with multiple stages, the stage-shedding technique is often employed to increase the light load efficiency, as disclosed by S. W. Hobrecht and R. G. Flatness in U.S. Pat. No. 6,674,274]. In this technique, the stages that are not necessary for power processing at light load are turned off so that their loss is eliminated. For example, in off-line power supplies with front-end PFC, the PFC stage can be turned off when the input power falls below 75 W, which is the lower input-power limit that requires PFC. Also, in desktop power supplies, the main power converter channel, i.e., both the PFC front end and the downstream multiple output dc/dc converter, are turned off in the standby mode and the standby power is supplied by a low-power standby converter. By completely eliminating the losses of a large high-power PFC and dc/dc converters, the standby power consumption can be substantially reduced, typically, below 3 W. Finally, the stage-shedding technique is extensively used to improve light load efficiency of power converters that utilize paralleled or interleaved stages such, for example, voltage regulation modules (VRMs). When applied to interleaved power processing stages, this technique is commonly referred to as the phase-shedding technique.

Finally, J. Choi, D. Huh, Y. Kim, "The improved burst mode in the stand-by operation of power supply", *IEEE Applied Power Electronics (APEC) Conf. Proc.*, pp. 426-432, 2004, disclose a converter that is turned-off in "burst"-mode for most of the time and the load is supplied by the energy stored in the output filter capacitor. To replenish this energy, the converter is turned-on periodically for a brief period of time. Since the converter stays off for the most of the time, its loss is substantially reduced, which increase the efficiency. The "burst"-mode of operation is supported by the majority of commercially available IC controllers.

Although the described techniques have been shown to improve the partial-load efficiency, they suffer from some major drawbacks that limit their area of application. For example, the major problem of reducing the switching frequency at light loads is an increased current ripple caused by increased volt-second product in the core of the output filter inductor. This increase in the ripple current has an adverse effect on the efficiency because it increases the conduction loss. The major concern with the bulk-voltage reduction and stage-shedding techniques is the dynamic performance. Specifically, their ability to restore full-power capability without output disturbance or other performance deterioration when the load suddenly changes from light load to full load. Finally, the "burst"-mode operation is limited to very low power levels primarily due to acoustic noise.

In this invention, implementations of power converters that offer maximized light-load efficiencies without the limitations of prior-art techniques are described.

SUMMARY OF THE INVENTION

Briefly according to one aspect of the present invention, a power converter system supplies power to one or more loads. The power converter system comprises at least one power converter operating at a desired efficiency; and a power storage system coupled to the at least one power converter for receiving power supplied from the at least one power converter and storing power therein when the at least one power converter operates at an efficiency that is below the desired efficiency.

According to another aspect of the present invention, a power converter system supplies power to at least one load. The power converter system comprises at least one power converter that supplies uninterrupted power to the at least one load anytime the power converter is operating at a desired efficiency; and a power storage system coupled to the at least one power converter for receiving power supplied from the at least one power converter and storing power therein when the at least one power converter operates at an efficiency that is below the desired efficiency.

According to still another aspect of the present invention, a power converter system supplies power under load conditions ranging from a higher load condition to a lower load condition. The power converter system comprises at least one power converter supplying uninterrupted power at the higher load condition at a desired efficiency; and a power storage system coupled to the at least one power converter for receiving power supplied from the at least one power converter and storing power therein under the lower load condition.

According to some of the more detailed features of the present invention, a power converter system supplies power to one or more loads. The power converter system comprises one or more power converters. Each power converter operates at a desired efficiency under a load condition. Any time the efficiency of a power converter drops below the desired efficiency or an efficiency threshold, the power converter is sequentially turned on during a first time interval and turned off during a second time interval. During the first time interval, the power converter operates at the desired efficiency to supply power to a power storage system. During the second time interval when the power converter is turned off, the power storage system operates auxiliary to the power converter to supply power to a load.

According to some of the more detailed features of the present invention, a power converter system powers one or more loads. The power converter system includes at least one power converter that supplies uninterrupted power to the load anytime the power converter is operating at a desired efficiency. The supply of power from the at least one power converter to the load is partially interrupted any time the power converter operates at a lower efficiency than the desired efficiency such that the at least one power converter is turned on during a first time interval and turned off during a second time interval. A power storage system operates auxiliary to the at least one power converter. During the first interval, the at least one power converter operates at the desired efficiency to supply power to the power storage system. During the second time interval when the at least one power converter is turned off, the power storage system supplies power to the one or more loads.

According to some of the more detailed features of the present invention, a power converter system supplies power under load conditions that range from a higher load condition to a lower load condition. One or more power converters supply uninterrupted power at the higher load condition at a desired efficiency and supply partially interrupted power at the lower load condition. The power of the power converter is partially interrupted by turning it on during a first time interval and turning it off during a second time interval. A power storage system operates auxiliary to the power converter. The power converter operates during the first time interval at the desired efficiency for supplying power to the power storage system and for supplying power under the lower load condition. The power storage system supplies power under the lower load condition during the second time interval when the power converter is turned off.

According to some of the more detailed features of the present invention, the power converter has a first output for supplying power to the power storage system during the first time interval and a second output for supplying power to the at least one load during the second time interval. Alternatively, the power converter has a single output for supplying power to the power storage system during the first time interval and supplying power to the at least one load during the second time interval. In another exemplary embodiment, the power storage system has a single port for receiving supply of power from the power converter during the first time interval and supplying power to the load during the second time interval. In another exemplary embodiment, the power storage system has a first port for receiving supply of power from the at least one power converter during the first time interval and a second port for supplying power to the at least one load during the second time interval. The power converter, the power storage system and the load are coupled in series.

According to other more detailed features of the present invention, the power converter comprises a power stage and an output filter. In one embodiment, the power storage system supplies power to the load via the output filter. In another embodiment, the power converter supplies power to the power storage system via the output filter. In various exemplary embodiments of the invention, the power converter comprises at least one of isolated, non-isolated, single-stage and multi-stage, ac/dc, dc/dc, dc/ac, and ac/ac power converter.

According to other more detailed features of the present invention, the power converter system further comprises a controller coupled to the at least one power converter and the power storage system for controlling the operations of the at least one power converter and the power storage system.

DETAILED DESCRIPTION OF THE INVENTION

Figure 1:
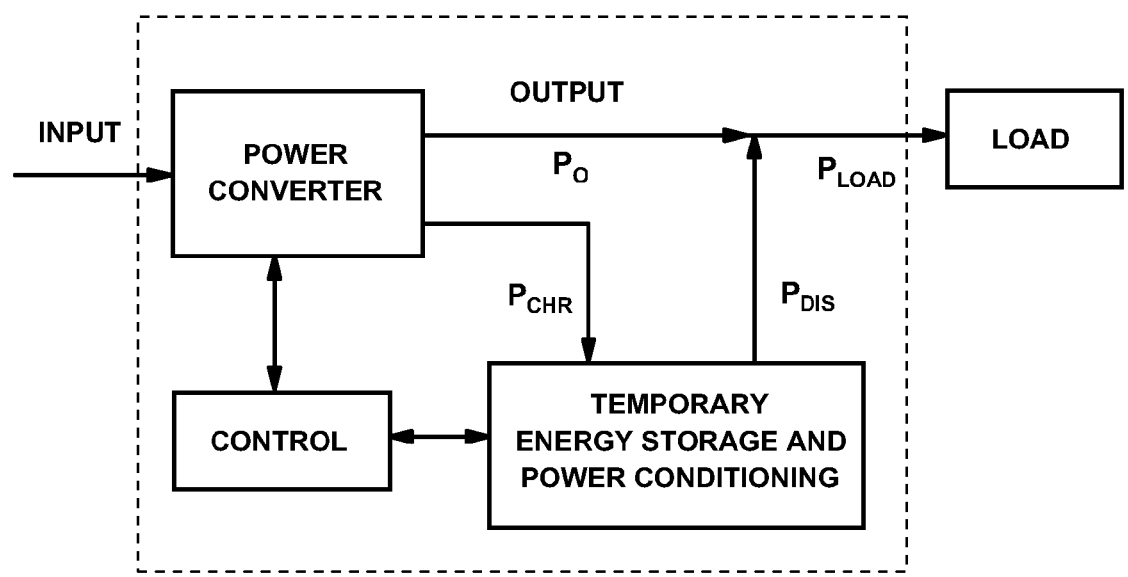
FIG. 1 shows a block diagram of preferred embodiment of the present invention.

A power converter system supplies power to one or more loads. The power converter system comprises one or more power converters. Each power converter operates at a desired efficiency under a load condition. The power converter system further comprises a power storage system coupled to the one or more power converters for receiving power supplied from the one or more power converters and storing power therein. When the efficiency of the power converter is below the desired efficiency, the power converter operates at the desired efficiency to supply power to the power storage system. Namely, the power converter system supplies power under load conditions ranging from a higher load condition to a lower load condition. The power converter system comprises one or more power converters supplying uninterrupted power at the higher load condition at a desired efficiency. The power converter system further comprises a power storage system coupled to the one or more power converters for receiving power supplied from the one or more power converters and storing power therein under the lower load condition.

According to one aspect of the present invention, a power converter system supplies power to one or more loads. The power converter system comprises one or more power converters. Each power converter operates at a desired efficiency under a load condition. Any time the efficiency of a power converter drops below the desired efficiency or an efficiency threshold, the power converter is sequentially turned on during a first time interval and turned off during a second time interval. During the first time interval, the power converter operates at the desired efficiency to supply power to a power storage system. Preferably, the power converter operates at the desired efficiency to supply power to an independent power storage system. During the second time interval when the power converter is turned off, the independent power storage system operates auxiliary to the power converter to supply power to a load. The power converter system further comprises a controller coupled to the at least one power converter and the power storage system for controlling the operations of the at least one power converter and the power storage system.

The power system of the present invention maintains high efficiency for one or more power converters across the entire load range, including higher load conditions (e.g., full loads) and lower load conditions (e.g., light loads). Specifically, the system of the invention substantially increase the conversion efficiency at light loads by minimizing switching and drive losses of semiconductor switches and core losses of magnetic components. These losses at light loads are minimized by sequentially turning on the power converter during a first time interval and turning off the power converter during a second time interval. In this way, the power converter partially interrupts the supply of power from the input to the output for a period of time. While the supply of power by the power converter is interrupted, power to the load is supplied from an independent power storage system, such as a low-power supplementary converter. In one exemplary embodiment, the independent power storage system operates as auxiliary to the power converter for supplying power to the load, when the power converter is turned off. The independent power storage system is supplied from an energy source that is charged during the periods the power converter is operating at a desired optimum efficiency, when transferring power from the input to the output. Since the independent power storage system is not supplied from the input of the main power converter, but from the power converter that generates an auxiliary energy source, the independent power storage system can be a simple non-isolated converter even in applications that require isolation. In fact, by creating the auxiliary energy source on the secondary side of the transformer in an isolated converter, the independent power storage system performance is optimized.

Unlike conventional power systems, the system of the present invention does not exhibit any transient problems when the load is abruptly changed from light to full load and the normal operation with continuous delivery of power at the descried optimum efficiency from the input to the output is resumed because the independent power storage system is arrange so that it shares the low-pass output filter with the main power converter. As a result, the energy in the energy-storage components of the output filter, i.e., inductors and/or capacitors, is always the same immediately before and after a load transition making the transient behavior to be identical to that of the main converter.

Generally, the ratio of the time duration during which the power converter processes the input power and the time duration it is decoupled from the input is dependent on the load power and the level of power that the main converter is processing when it is coupled to the input because the load power is approximately equal to the average power processed by the main power converter. The frequency of the first time interval when the main power is turned on and the second time interval when the main power converter is turned off can be arbitrarily selected provided that it is lower than the crossover frequency of the power converter. To maximize the light-load efficiency, the power processing when the main power converter supplies power to the loads should be done at the level that exhibits the desired optimum efficiency.

Alternatively, any time the at least one power converter operates at an efficiency that is below the desired efficiency, the power converter operates at the desired efficiency to supply power to the power storage system and the power storage system supplies power to the at least one load simultaneously. Alternatively, any time the at least one power converter operates at an efficiency that is below the desired efficiency, the power converter operates at the desired efficiency to supply power to the power storage system and the at least one load and the power storage system supplies power to the at least one load simultaneously.

The present invention is applicable to any power conversion circuit. Specifically, it is applicable to isolated and non-isolated, single-stage and multi-stage, ac/dc, dc/dc, dc/ac, and ac/ac power supplies. The present invention is applicable to any power converter system. Specifically, it is applicable to power conversion system for LED, power conversion system for solar cell, power conversion system for fuel cell, power conversion system for wind energy, power conversion system for vibrating energy, power conversion system for kinetic energy, power conversion system for thermal energy, power plant, power management and conversion system for architecture, power management and conversion system for data center, UPS, power conversion system for vehicle, power conversion system for computer or notebook, power conversion system for communication device or apparatus, power conversion system for consumer electronics product, power conversion system for household electric appliance, etc.

The present invention is better understood upon consideration of the detailed description below and the accompanying drawings.

A block diagram of the preferred embodiment of the present invention that maximizes the lower load condition or light-load efficiency of a power converter is shown in FIG. 1. The power system shown in FIG. 1 supplies power to a load. In one exemplary embodiment, the power system comprises a power converter, an independent power storage system, and control circuit. Generally, the power converter in FIG. 1 can be any single-stage or multi-stage, isolated or non-isolated ac/dc, dc/dc, dc/ac, or ac/ac converter. The independent power storage system can comprise any energy storage device, medium, or component capable of storing energy such, for example, one or more capacitors, super capacitors, batteries, flywheels, fuel cell, etc.

Figure 2:
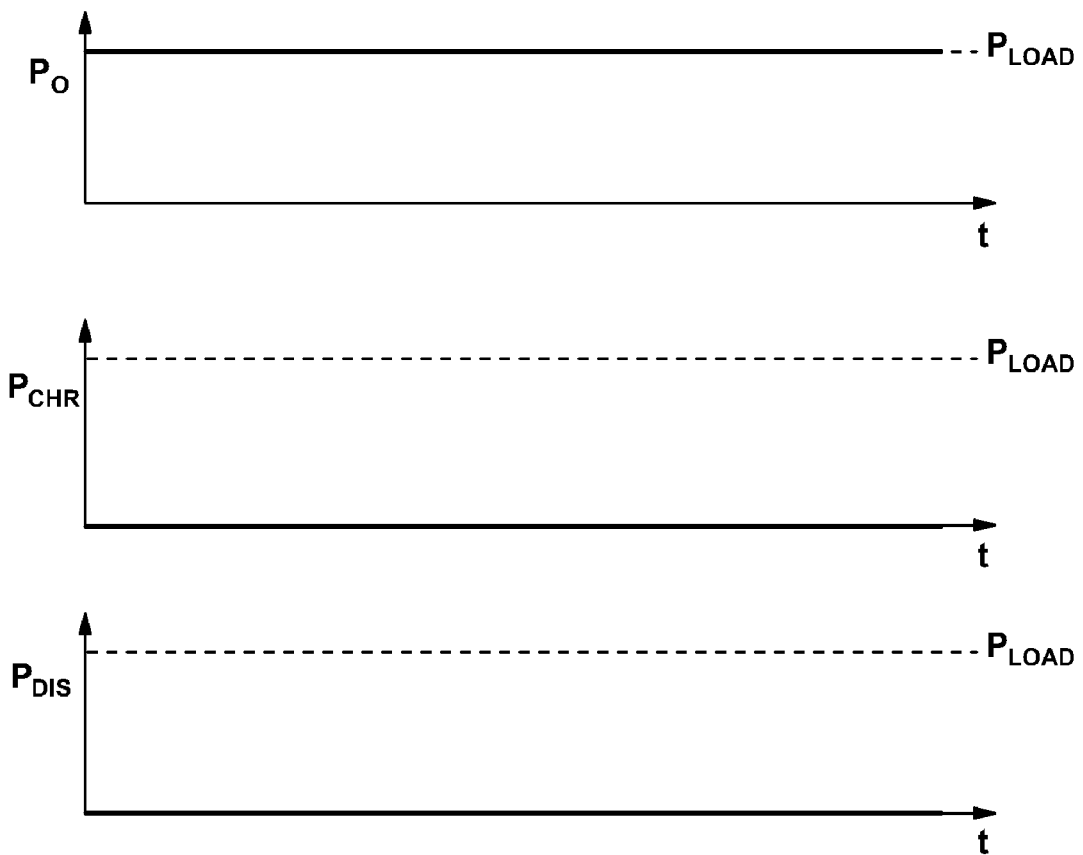
FIG. 2 shows the power flow timing diagram of the preferred embodiment in FIG. 1 at higher load conditions. $P_O$ is output power, $P_{CHR}$ is charging power, and $P_{DIS}$ is discharging power.

The independent power storage system in FIG. 1 only operates to supply power under lower load or light load conditions, preferably, below a certain level of load power. Above this power level up to the full load, the independent power storage system is turned off so that the entire load power is continuously supplied from the output of the power converter in an uninterrupted manner, as illustrated by the power flow diagram in FIG. 2. As can be seen from FIG. 2, at heavy loads, the both charging power $P_{CHR}$ and discharging power $P_{DIS}$ are continuously zero, whereas output power of the power converter $P_O$ is equal to load power $P_{LOAD}$.

Figure 3:
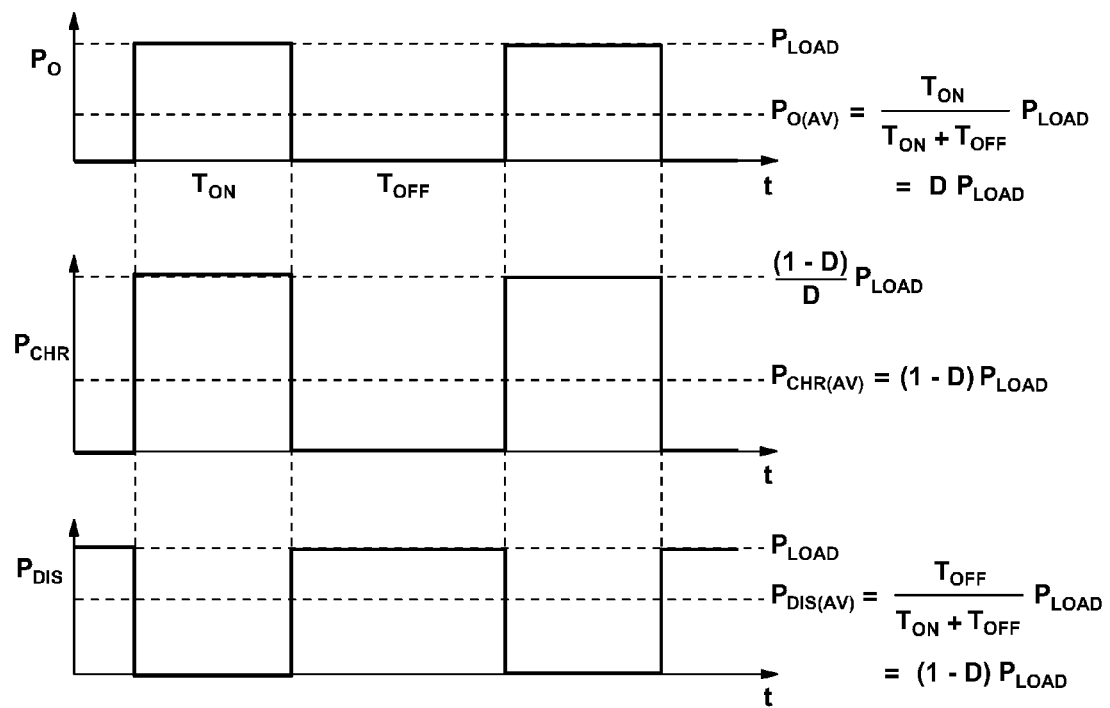
FIG. 3 shows the power flow timing diagram of the preferred embodiment in FIG. 1 at lower load conditions. $P_O$ is output power, $P_{CHR}$ is charging power, and $P_{DIS}$ is discharging power.

At light loads, however, the power converter is sequentially or periodically turned on during a first time interval and turned off during a second time interval to reduce switching losses and, thus, improve the light-load efficiency. During the second time interval when the power converter is off, the load power is supplied from the independent power storage system through a temporary energy storage and power conditioning circuit. As can be seen from the power flow timing diagram in FIG. 3, during the first time interval when the power converter is on, the power converter is operated at the desired efficiency to simultaneously supply load power $P_{LOAD}$ and charge power $P_{CHR}$ of the independent power storage system. During the second time interval when the power converter is turned off, the load power is entirely supported by the discharging of the independent power storage systems. Since in this mode of operation the load power is either supplied by the power converter output or by the stored energy, the instantaneous power delivered by the power converter during the first time interval called the on time $T_{ON}$ is $P_O=P_{LOAD}$ and the instantaneous power delivered from the independent power storage system during the second time interval called off time $T_{OFF}$ is $P_{DIS}=P_{LOAD}$. Defining duty cycle D as $D=T_{ON}/(T_{ON}+T_{OFF})$, average power delivered by the converter output is $P_{O(AV)}=DP_{LOAD}$, whereas the average power discharged from the independent power storage system is $P_{DIS(AV)}=(1-D)P_{LOAD}$. Since average charging power $P_{CHR(AV)}$ must be equal to average discharging power $P_{DIS(AV)}$, the average charging power is $P_{CHR(AV)}=(1-D)P_{LOAD}$. As a result, the instantaneous charging power $P_{CHR}$ during on time $T_{ON}$ is $P_{CHR}=(1-D)P_{LOAD}/D$, as illustrated in FIG. 3. Therefore, total instantaneous power P delivered by the power converter during on time is $$P = P_O + P_{CHR} \quad (1)$$
$$= P_{LOAD} + \frac{1-D}{D} P_{LOAD}$$
$$= \frac{P_{LOAD}}{D},$$

i.e., $$P_{LOAD} = D \cdot P. \quad (2)$$

Figure 4:
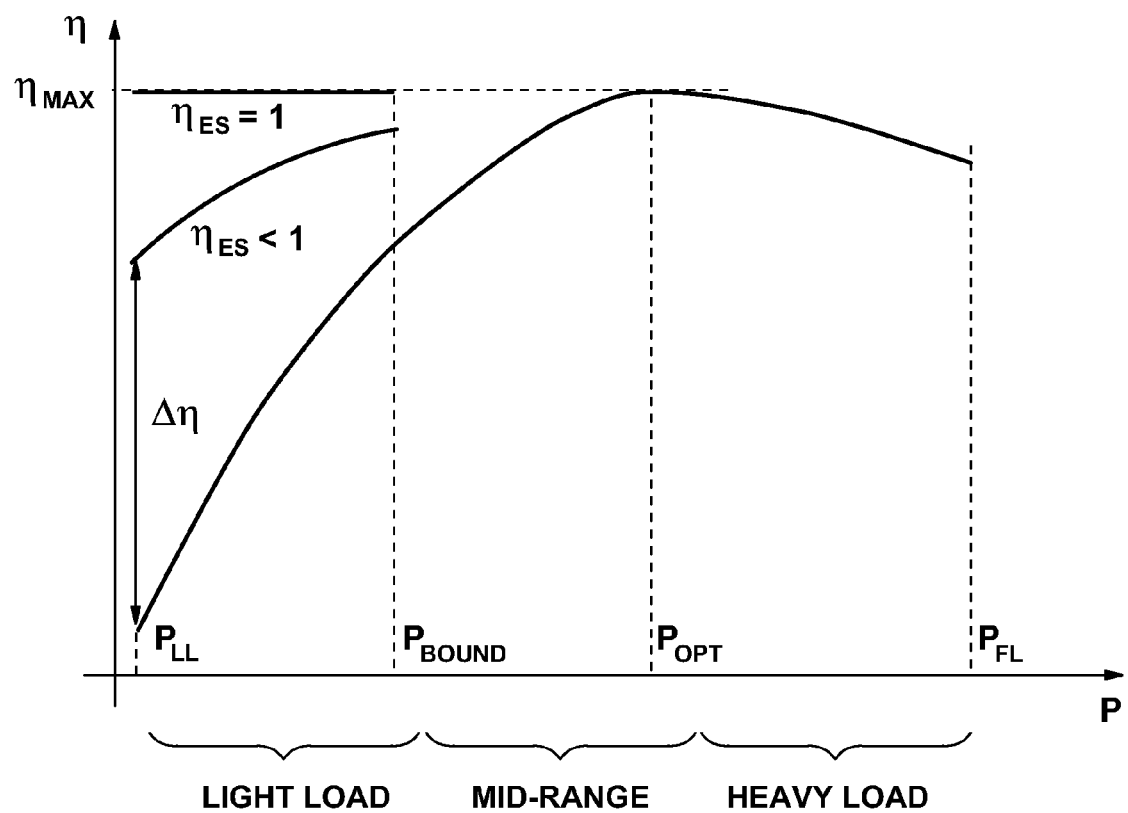
FIG. 4 shows typical efficiency profile of power converter with respect to delivered power.

Thus the power converter of the present invention operates in a continuous modes when it supplies power to the load at a desired efficiency with uninterrupted power supply. When the efficiency drops below an efficiency threshold, the power converter operates in a pulsed mode when it is sequentially turned on and off as described above. It should be noted that boundary load power between continuous and pulse modes of operation of the power converter $P_{BOUND}$ can be set at a suitable efficiency threshold level, which could be any arbitrary level. However, to optimize the performance, the control of the power converter can be designed so that the instantaneous power P delivered by the power converter during the first time interval, i.e., on time, is selected at a desired efficiency, which can be the maximum efficiency point. As illustrated in FIG. 4, a typical power converter efficiency dependence on output power exhibits a peak at mid-range power levels. By selecting $P=P_{OPT}$, i.e., by always operating the converter at the power level with maximum efficiency $\eta_{MAX}$, the light-load efficiency below the set level of $P_{BOUND}$ ($<P_{OPT}$) is maximized. With such a control, duty cycle D is determined by $$D = \frac{P_{LOAD}}{P_{OPT}}, \quad (3)$$
$$P_{LOAD} \le P_{BOUND} \le P_{OPT}.$$

By assuming that the energy-storage device charging and discharging efficiencies are $\eta_{CHR}$ and $\eta_{DIS}$, respectively, the conversion efficiency at power levels below $P_{BOUND}$ is given by $$\eta = \frac{\eta_{MAX}}{D + \frac{1-D}{\eta_{CHR} \cdot \eta_{DIS}}} \quad (4)$$
$$= \frac{\eta_{MAX}}{D + \frac{1-D}{\eta_{ES}}},$$

where $\eta_{ES}=\eta_{CHR}\eta_{DIS}$ is the efficiency of the total power process by energy storage and power conditioning block.

In the ideal case when no energy is lost during the charging and discharging of the energy-storage device, i.e., when $\eta_{ES}=1$ is assumed, light-load efficiency $\eta$ is equal to $\eta_{MAX}$ all the way to a minimum load, as illustrated in FIG. 4. However, in practice, because $\eta_{ES}<1$ the light-load efficiency is lower than $\eta_{MAX}$ and exhibits a fall-off as power is reduced, as shown in FIG. 4. Generally, to achieve light-load efficiency improvement $\Delta\eta$, it is necessary to make a favorable trade-off between the power saved by periodically turning-off the power converter and the power lost in the charging and discharging process of the energy-storage device. By solving Eq. (4) for $\eta_{ES}$, minimum efficiency $\eta_{ES(MIN)}$ required to improve efficiency at load power $P_{LL}$ is $$\eta_{ES(MIN)} > \frac{(1-D)}{\frac{\eta_{OPT}}{\eta_{LL}} - D}, \quad (5)$$

where $\eta_{LL}$ is the original efficiency of the power converter at $P_{LL}$ and $D=P_{LL}/P_{OPT}$.

It should be noted that while duty cycle D is precisely defined by Eq. (3), once power level $P_{OPT}$ is set and load power $P_{LOAD}<P_{BOUND}$ is known, the frequency at which the power converter is turned on and off is less well defined. Generally, the upper frequency limit is related to the large signal dynamic response time of the converter, whereas the lower frequency limit is determined by the size and required energy-storage capacity of the energy-storage device because more stored energy is required at lower frequencies to support the load power during prolonged off time. For power levels of several hundred Watts, typical minimum frequency for electrolytic-capacitor-type energy storage is in the several Hertz to several hundred of Hertz range, whereas sub-hertz frequencies can be achieved by employing batteries, flywheels, and similar storage devices. Finally, it should be noted that it is desirable to keep the switching frequency bellow the audio range to avoid acoustic noise associated with the switching of a relatively large power.

Many variations of the embodiment of the present invention are possible. Generally, these variations are in the manner the charging and discharging power paths of the circuit are coupled to the power converter, output, and load. Some examples of these variations are given in FIGS. 5 through 8.

Figure 5:
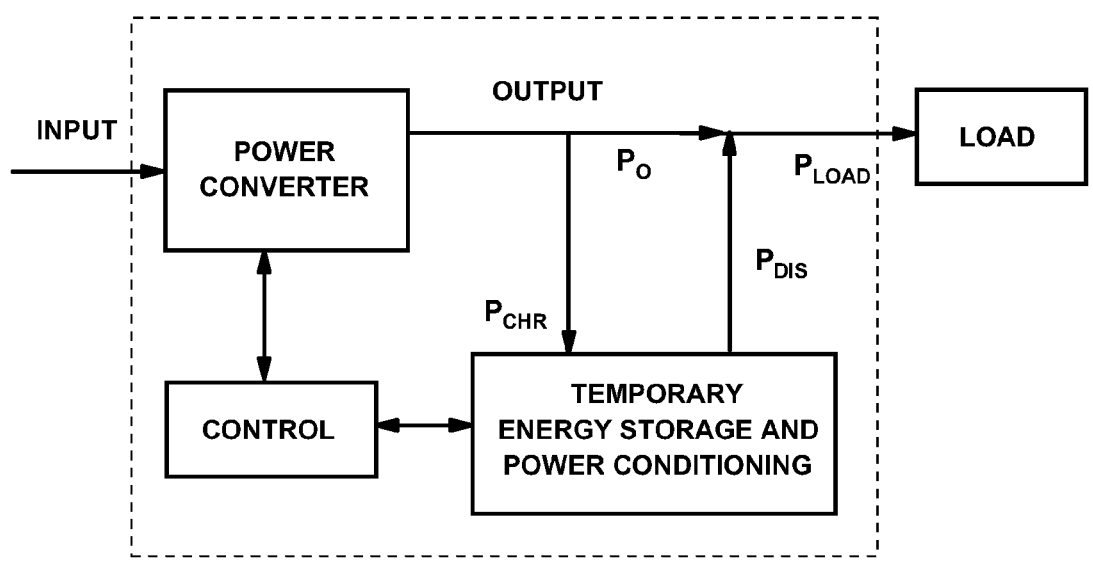
FIG. 5 shows the embodiment of the present invention with charging energy of the independent power storage system directly supplied from the output of the power converter.
Figure 6:
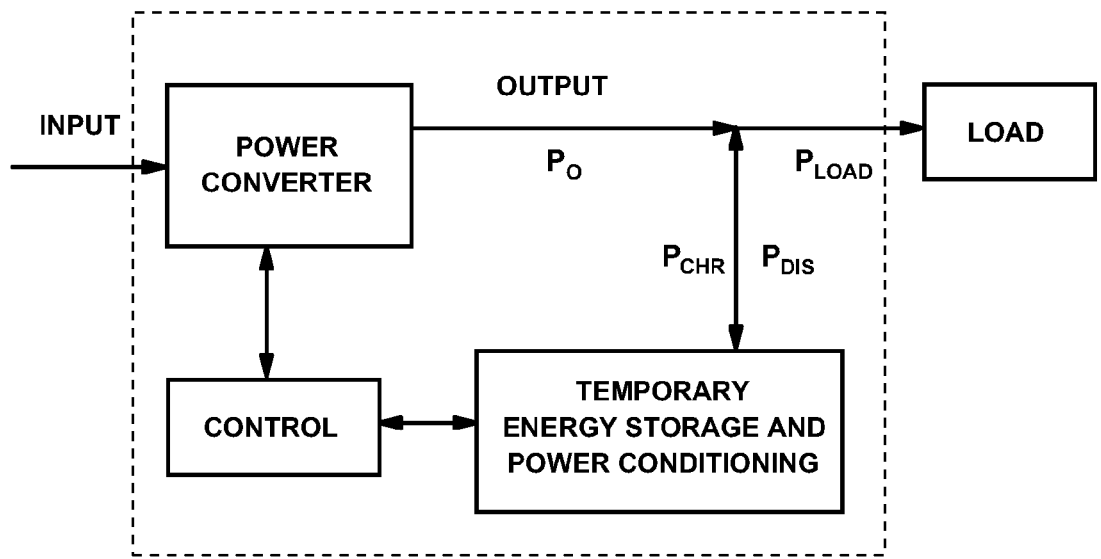
FIG. 6 shows the embodiment of the present invention with a common charging and discharging power paths coupled to output of the power converter.

FIG. 5 shows the embodiment of the present invention where the charging energy is supplied from by the output of the power converter to the independent power storage system and discharge energy form the independent power storage system is also supplied to the load via the output of the power converter. FIG. 6 shows the embodiment of the present invention with charging energy $P_{CHR}$ supplied from the output of the converter that also supplies the load power. Under this arrangement, the power converter has a single output for supplying power to the independent power storage system during the first time interval and supplying power to the at least one load during the second time interval in a bidirectional time multiplexed manner. Thus, the present invention can be implemented with common energy charging and discharging paths.

Figure 7A:
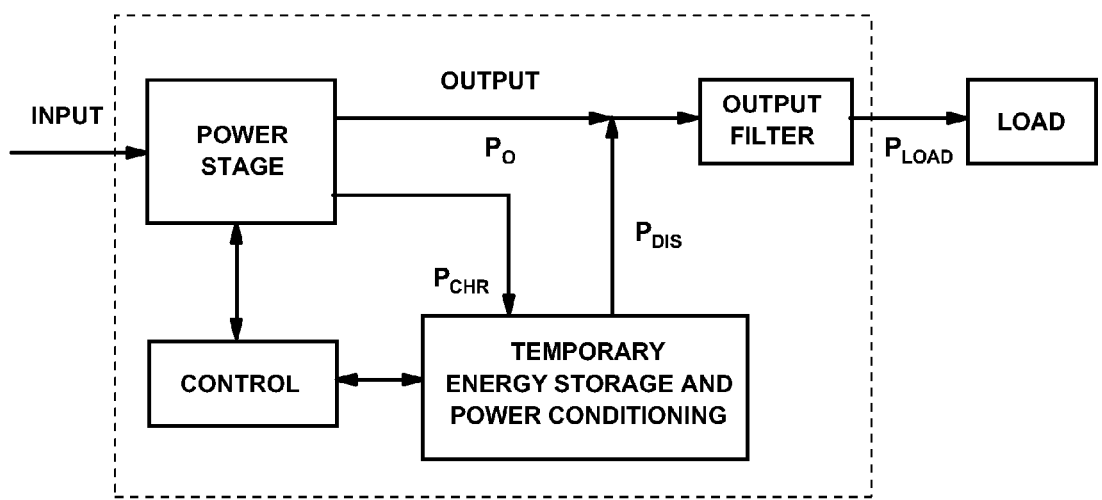
FIGS. 7(a)-7(d) show embodiments of the present invention with the independent power storage system connected at the input of the output filter of the power converter.
Figure 7B:
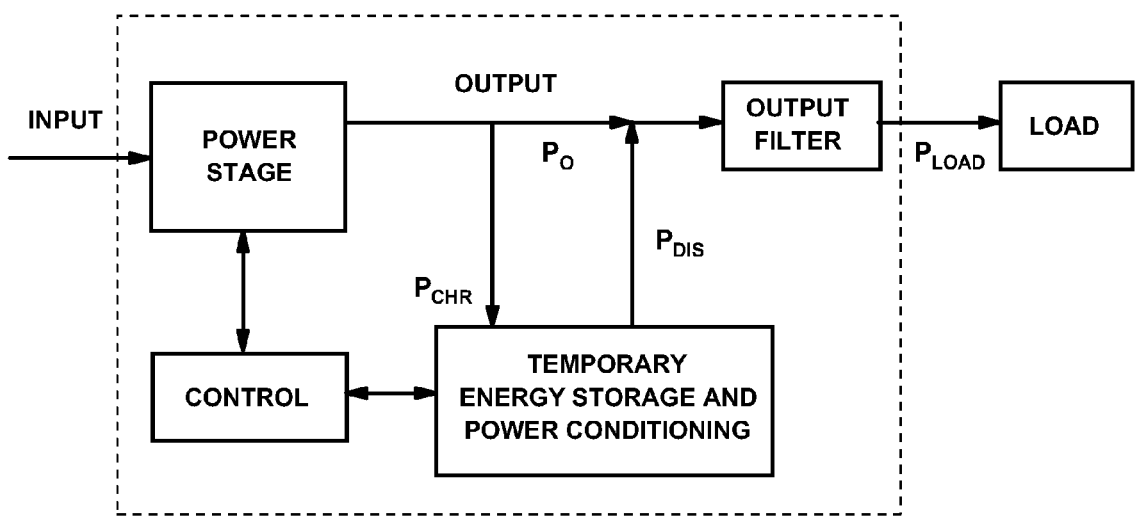
Figure 7C:
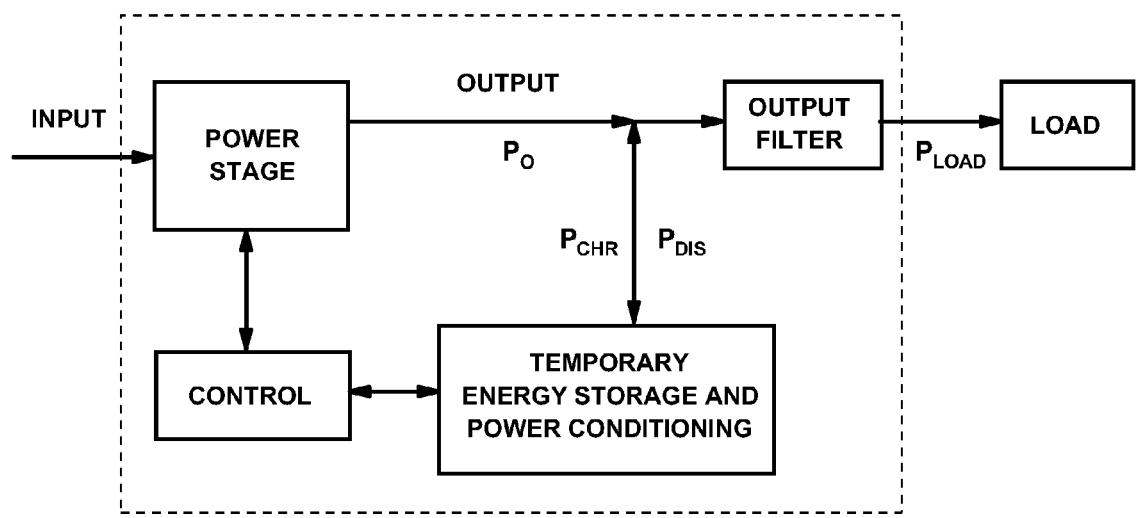
Figure 7D:
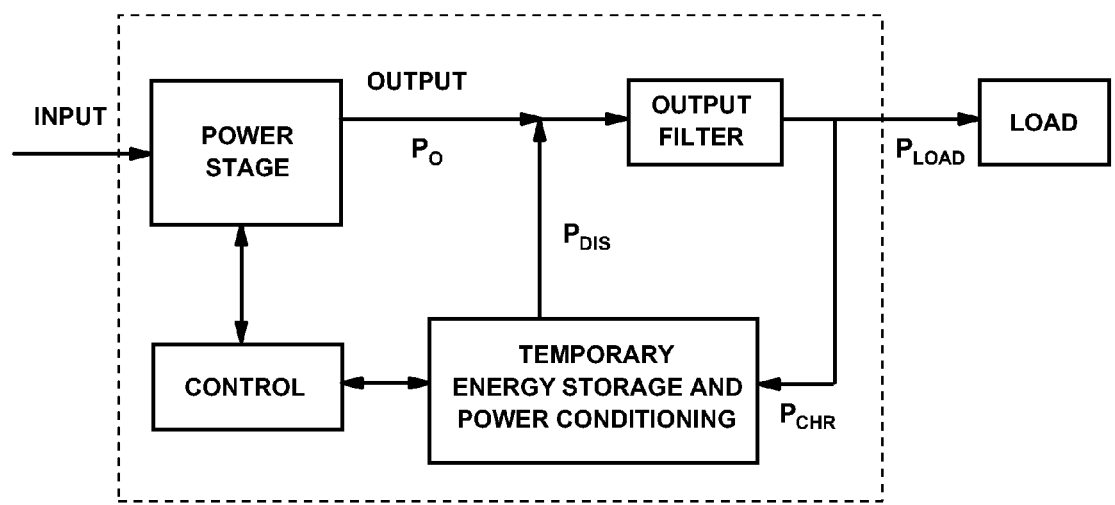

FIGS. 7(a)-7(d) shows various embodiments of the present invention where the power converter comprises two stages: a power stage and an output filter stage. FIG. 7(a) shows separate charging and discharging paths with charging power supplied from a second output of the power stage and discharging path to the load is supplied from the independent power storage system via the output filter. FIG. 7(b) shows separate charging path supplied from the output of the power stage and discharging path from the independent power storage system is also via the output of the power stage into the load via the output filter. FIG. 7(c) shows common charging and discharging paths between the power stage and the output filter. FIG. 7(d) shows separate charging and discharging paths with charging power supplied from the output of the output filter and discharging path connected to the input of the output filter. The implementations with common charging and discharging paths require the employment of a bidirectional converter in the independent power storage system.

Generally, charging and discharging paths does not need to be coupled directly to input and/or output, but can be coupled to any suitable point in the power conversion path. As stated above, FIGS. 7(a)-(d) shows various embodiments of the present invention where the power converter and the independent power storage systems share the output filter, i.e., where the charging and/or discharging paths are coupled before the output filter of the power converter. If properly designed, these implementations can reduce, or even completely eliminate, transients caused by periodic turning on and off of the power converter. Namely, since in these implementations the output-filter inductor current is continuously flowing, i.e., it is either supplied from the converter or from the discharging energy-storage device, it does not exhibit significant transient if the circuit is designed so that the current supplied by the converter when it is on and the current supplied by energy-storage device during off-time are reasonably matched.

Figure 8:
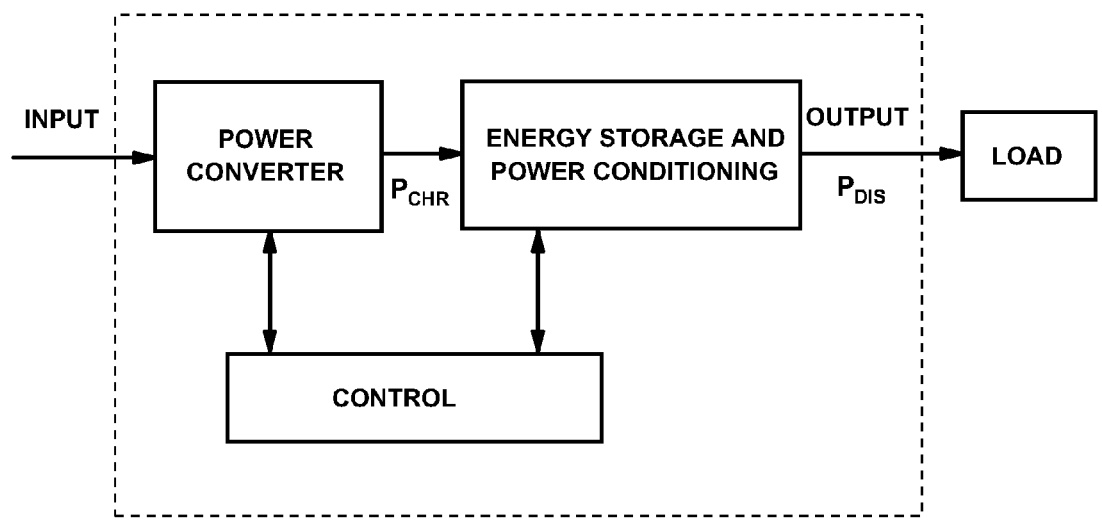
FIG. 8 shows an embodiment of the present invention with the independent power storage system in series with the power converter.
Figure 9:
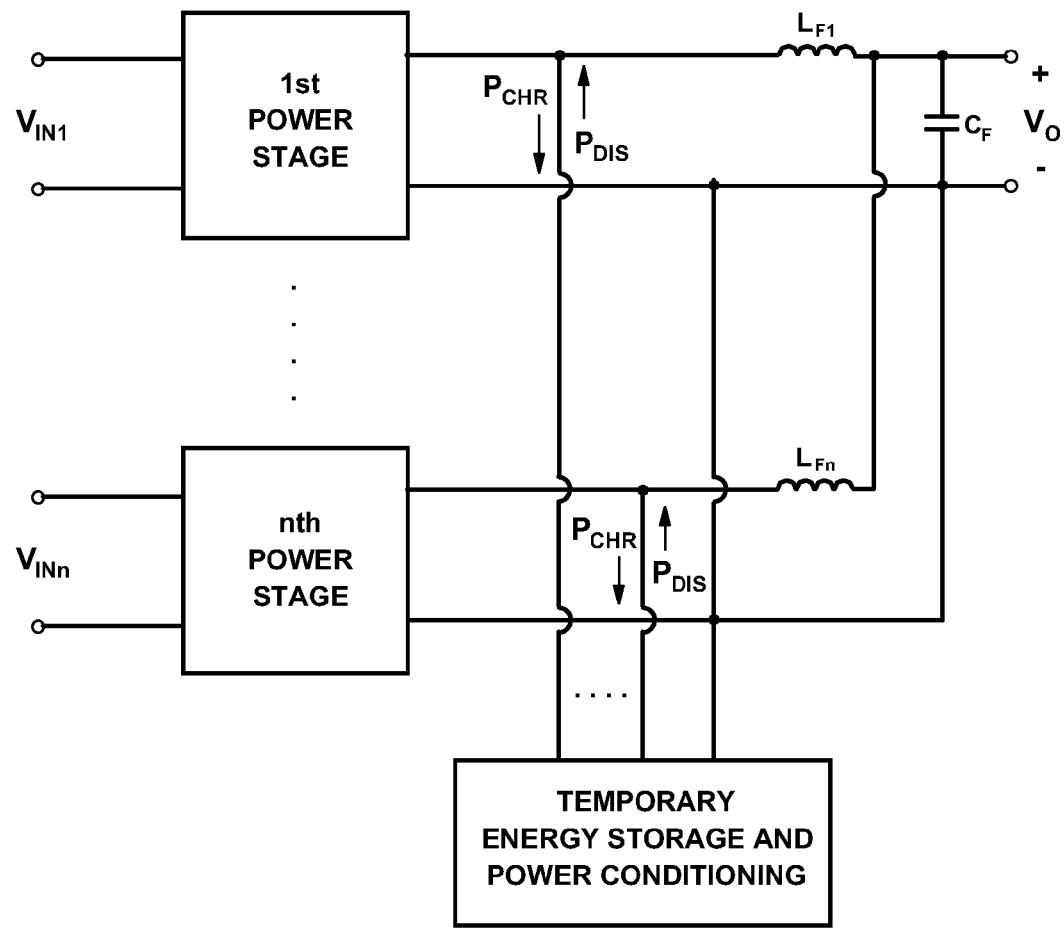
FIG. 9 shows an embodiment of the present invention with the independent power storage system connected at the input of the output filter of the power converter in multiple power converters connected in parallel at the output.
Figure 10:
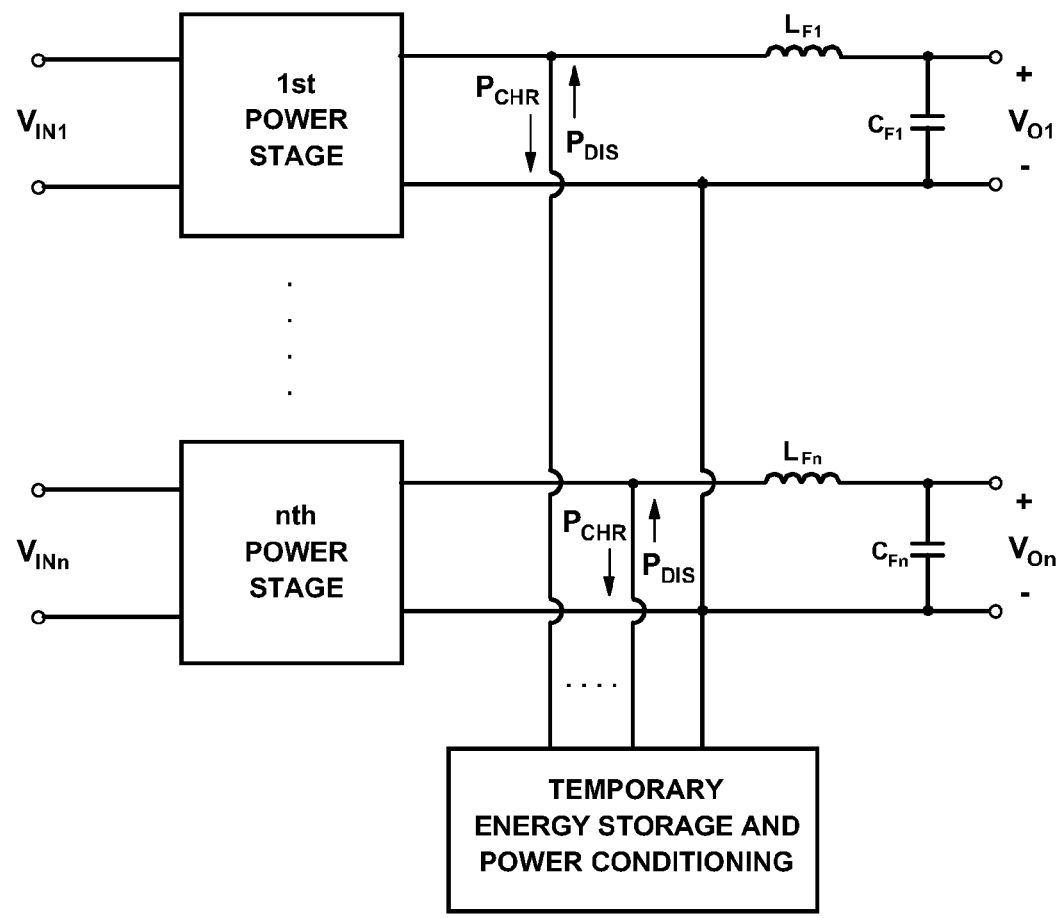
FIG. 10 shows the embodiment of the present invention with the independent power storage system connected at the input of the output filter of the power converter in multiple converters with independent outputs.

In some applications coupling the independent power storage system in series with the power converter, as shown in FIG. 8, may be more beneficial for improving light-load efficiency than the previous implementations with the independent power storage system coupled in parallel to the power converter. It should be noted that the present invention can also be applied in applications with multiple converter, as illustrated in FIGS. 9 and 10. FIG. 9 shows an embodiment of the present invention with a shared output filter in multiple power converters connected in parallel at multiple outputs, whereas FIG. 10 shows an embodiment of the present invention with independent multiple outputs.

Figure 11A:
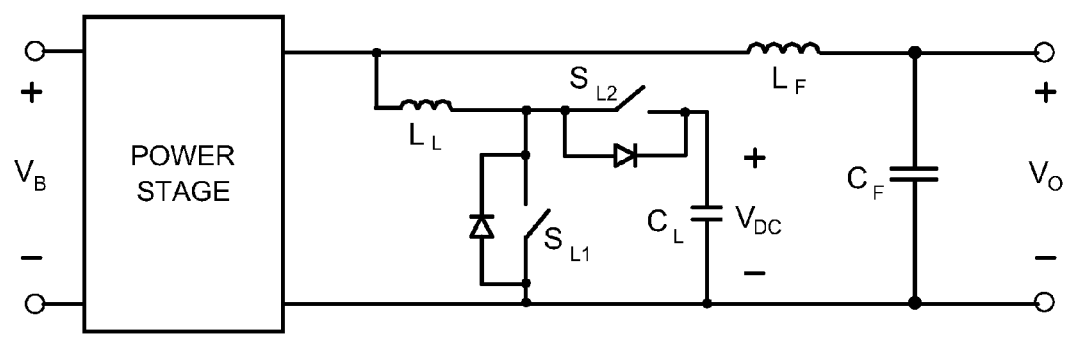
FIGS. 11(a)-(h) show various implementations of temporary energy storage and power conditioning circuit for embodiments with the independent power storage system connected at the input or the output of the output filter of a dc/dc power converter.
Figure 11B:
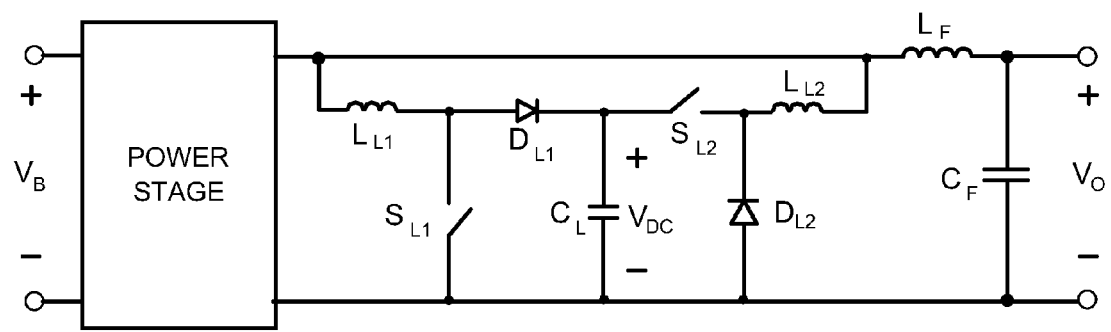
Figure 11C:
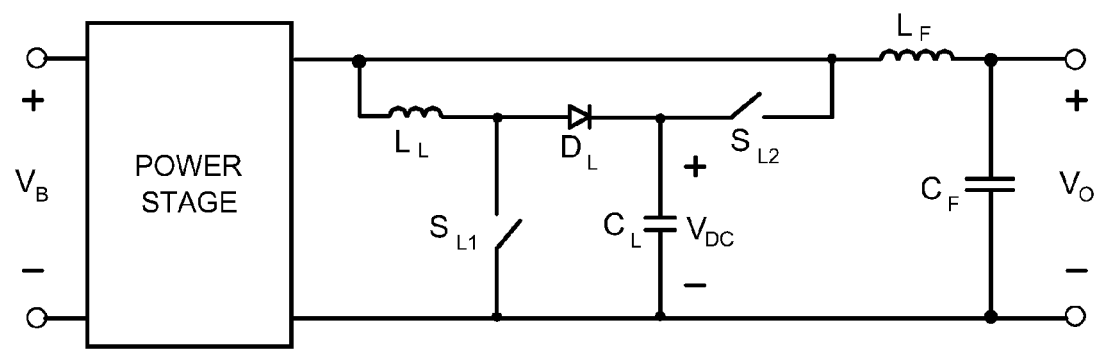
Figure 11D:
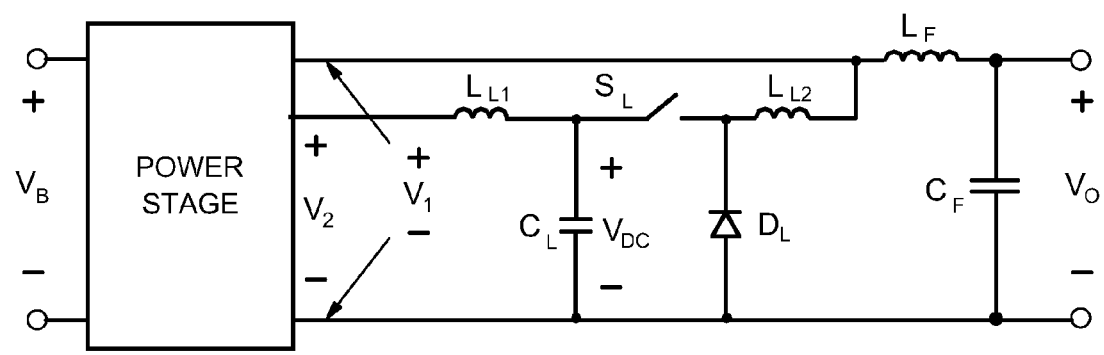
Figure 11E:
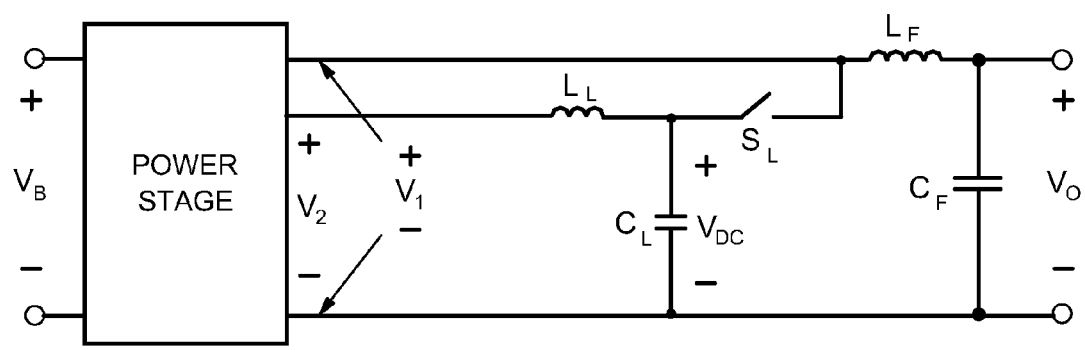
Figure 11F:
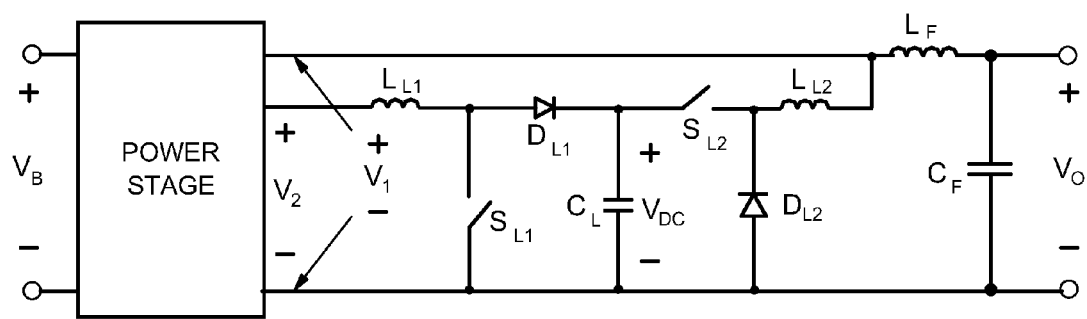
Figure 11G:
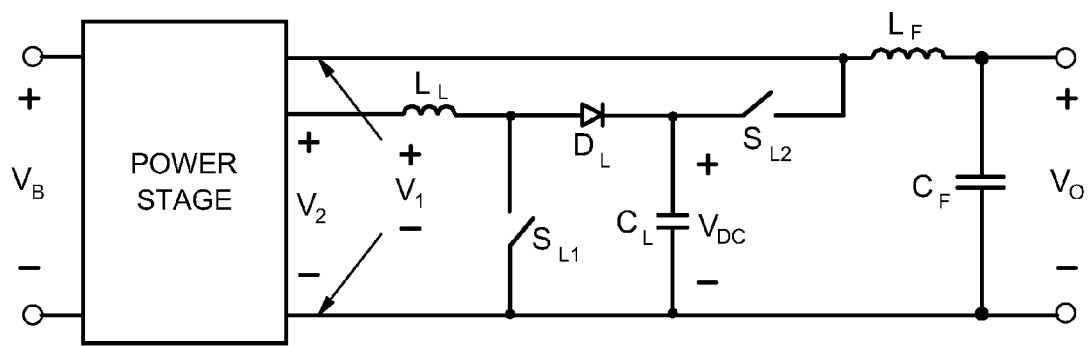
Figure 11H:
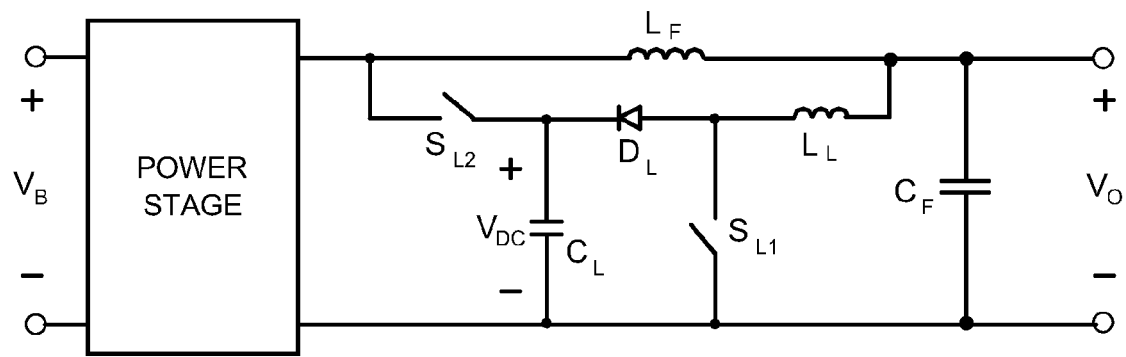

FIGS. 11(a)-(h) show various embodiment of the present invention with a shared output filter in multiple converters with independent outputs. More specifically FIGS. 11(a)-(h) show various implementations of temporary energy storage and power conditioning circuit for embodiments with the independent power storage system connected at the input of the output filter of a dc/dc power converter. FIG. 11(a) shows common charging and discharging path employing a bidirectional buck/boost converter. In one exemplary embodiment, the bidirectional buck/boost converter comprises boost switch $S_{L1}$, buck switch $S_{L2}$, inductor $L_L$, and capacitor $C_L$. FIG. 11(b) showing separate charging and discharging paths with charging power supplied from the output of the power stage and employing a boost converter for charging and a buck converter for discharging. In one exemplary embodiment, the boost converter comprises boost switch $S_{L1}$, boost diode $D_{L1}$, inductor $L_{L1}$, and capacitor $C_L$. The buck converter comprises buck switch $S_{L2}$, buck diode $D_{L2}$, inductor $L_{L2}$, and inductor $L_F$. FIG. 11(c) shows separate charging and discharging paths with charging power supplied from the output of the power stage and employing a boost converter for charging and a buck converter for discharging, where the buck converter and the power converter share the output filter. In one exemplary embodiment, the boost converter comprises boost switch $S_{L1}$, boost diode $D_L$, inductor $L_L$, and capacitor $C_L$. The buck converter comprises buck switch $S_{L2}$, the power-stage diode, inductor $L_F$, and capacitor $C_F$. FIG. 11(d) shows separate charging and discharging paths with charging power supplied directly from a second output of the power stage and employing a buck converter for discharging. In one exemplary embodiment, the buck converter comprises buck switch $S_L$, buck diode $D_L$, inductor $L_{L2}$, and inductor $L_F$. FIG. 11(e) shows separate charging and discharging paths with charging power supplied directly from a second output of the power stage and employing a buck converter for discharging, where the buck converter and the power converter share the output filter. In one exemplary embodiment, the buck converter comprises buck switch $S_L$, the power-stage diode, inductor $L_F$, and capacitor $C_F$. FIG. 11(f) shows separate charging and discharging paths with charging power supplied from a second output of the power stage through a boost charging circuit and employing a buck converter for discharging. In one exemplary embodiment, the boost charging circuit comprises boost switch $S_{L1}$, boost diode $D_{L1}$, inductor $L_{L1}$, and capacitor $C_L$. The buck converter comprises buck switch $S_{L2}$, buck diode $D_{L2}$, inductor $L_{L2}$, and inductor $L_F$. FIG. 11(g) shows separate charging and discharging paths with charging power supplied from a second output of the power stage through a boost charging circuit and employing a buck converter for discharging, where the buck converter and the power converter share the output filter. In one exemplary embodiment, the boost charging circuit comprises boost switch $S_{L1}$, boost diode $D_L$, inductor $L_L$, and capacitor $C_L$. The buck converter comprises buck switch $S_{L2}$, the power-stage diode, inductor $L_F$, and capacitor $C_F$. FIG. 11(h) shows separate charging and discharging paths with charging power supplied from the output of the power stage through a boost charging circuit and discharging circuit connected to the input of the output filter.

Figure 12A:
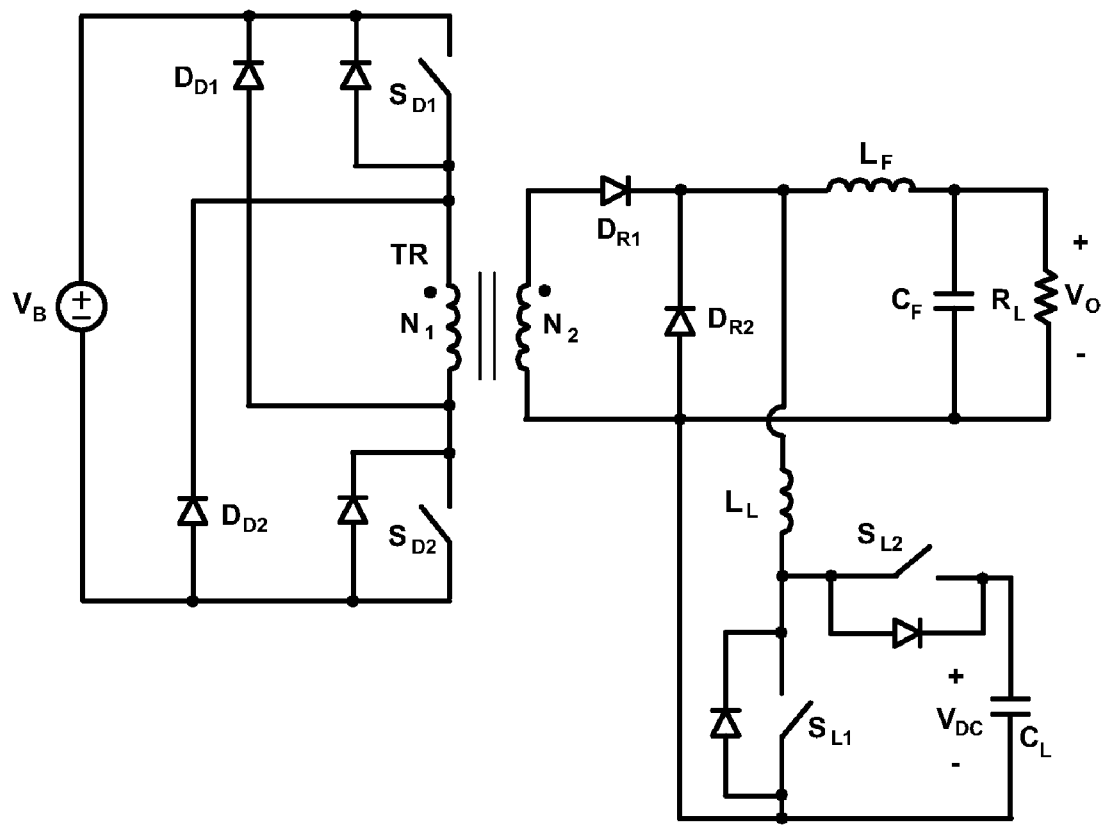
FIGS. 12(a)-(i) show implementations of a two-switch forward dc/dc converter for embodiments with the independent power storage system connected at the input of the output filter.
Figure 12B:
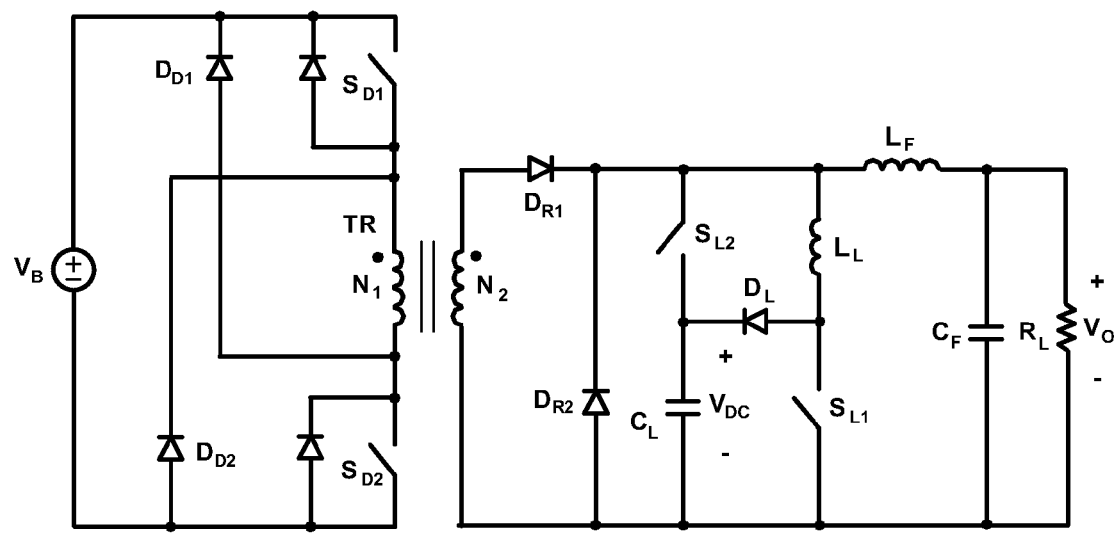
Figure 12C:
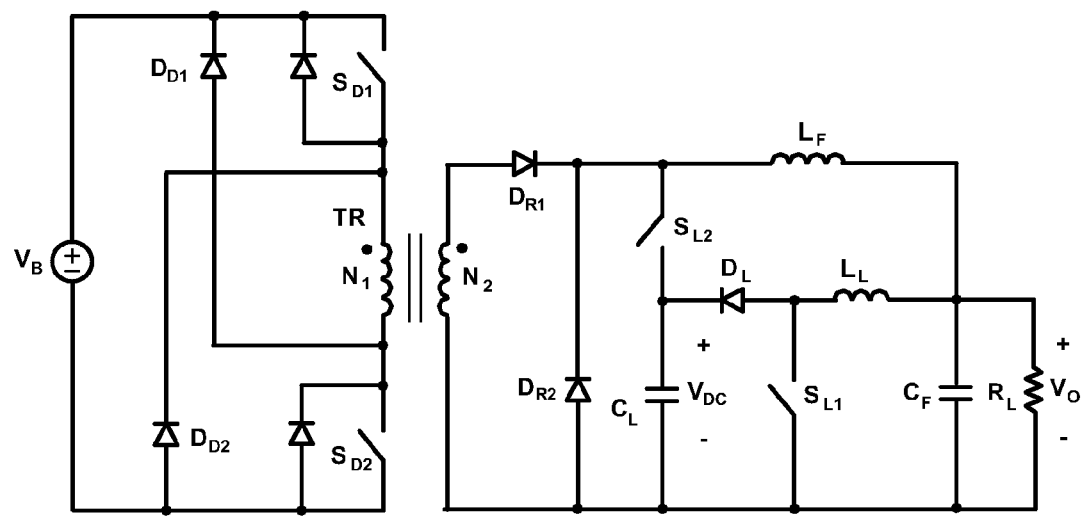
Figure 12D:
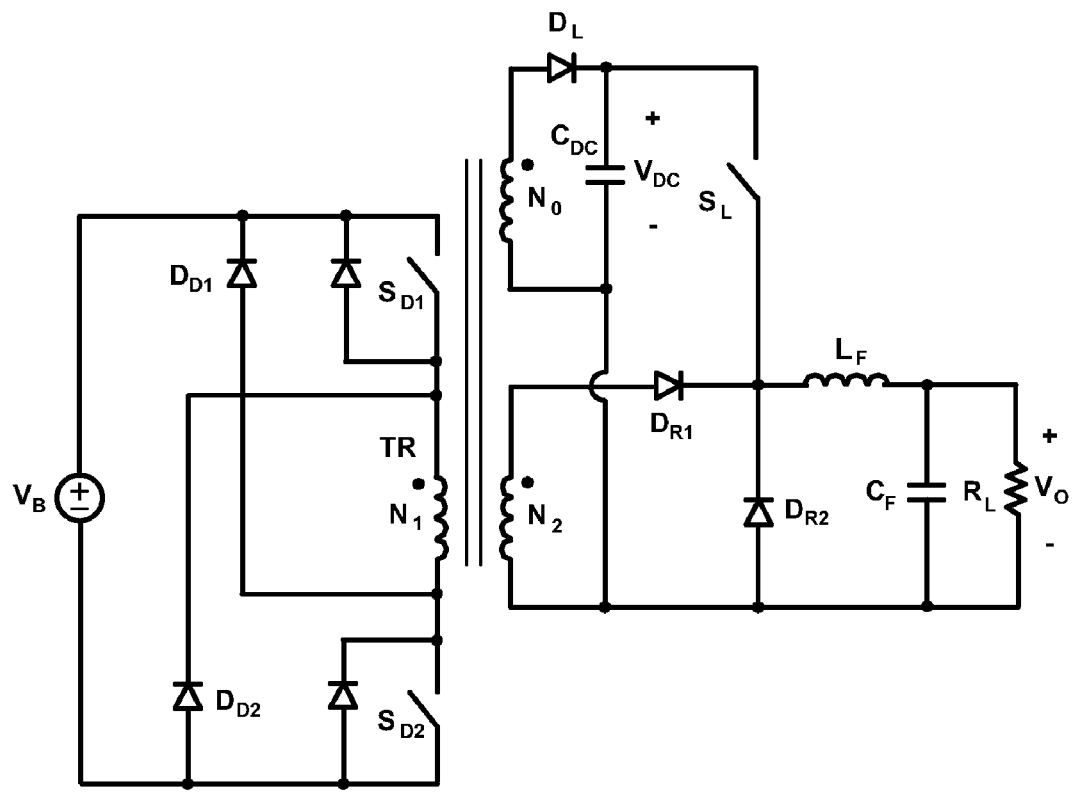
Figure 12E:
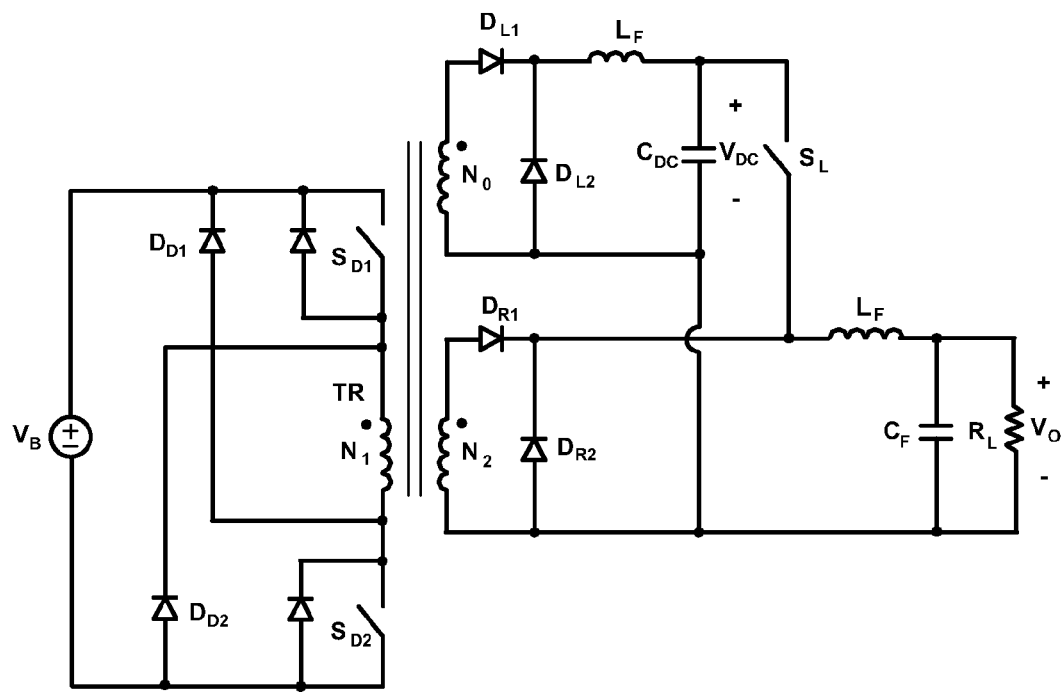
Figure 12F:
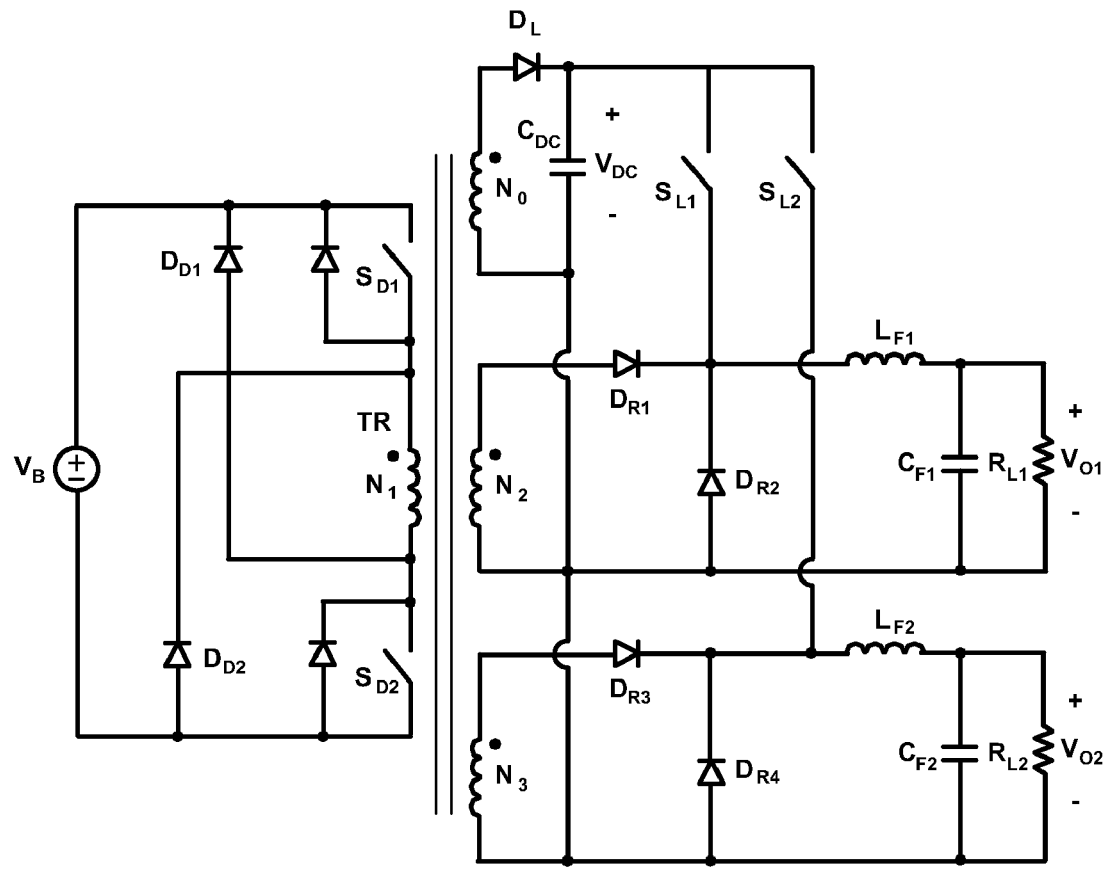
Figure 12G:
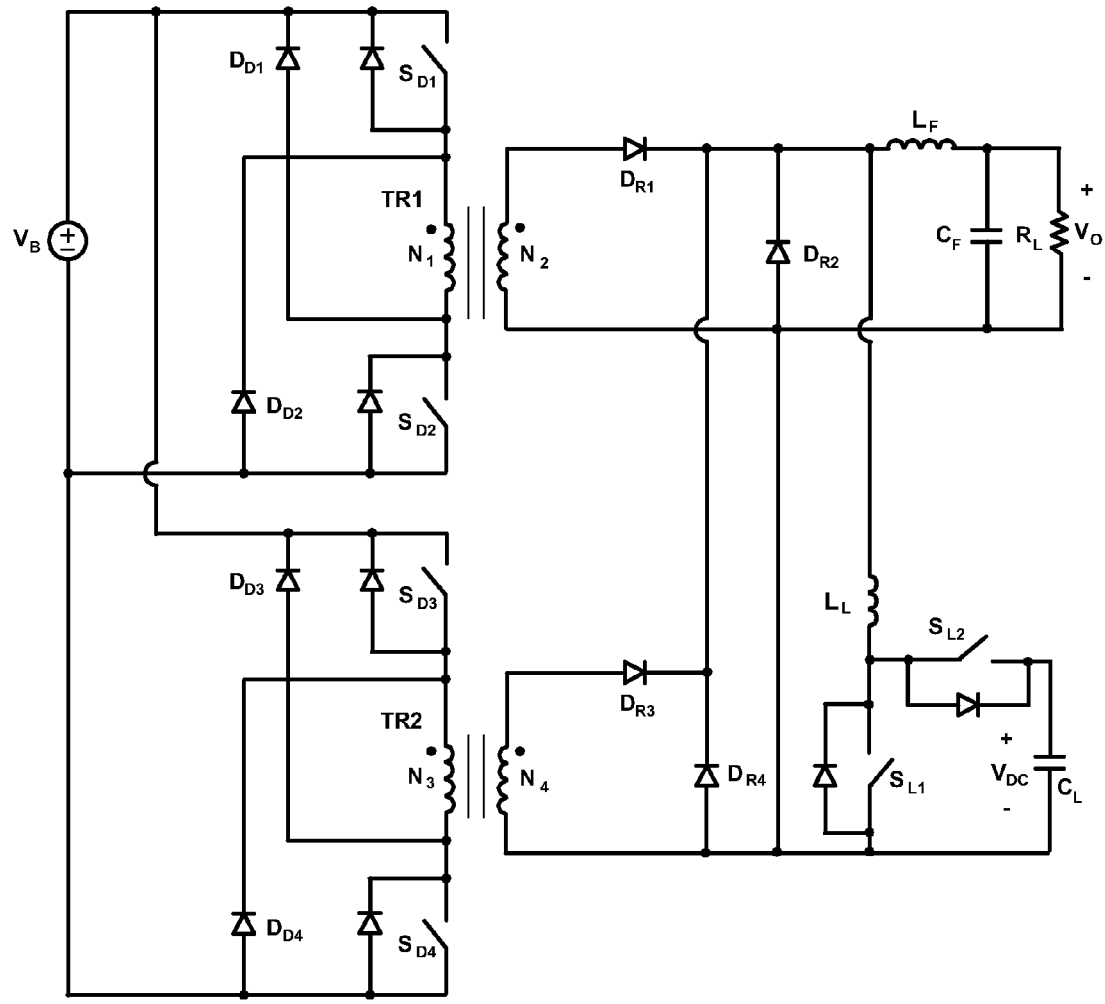
Figure 12H:
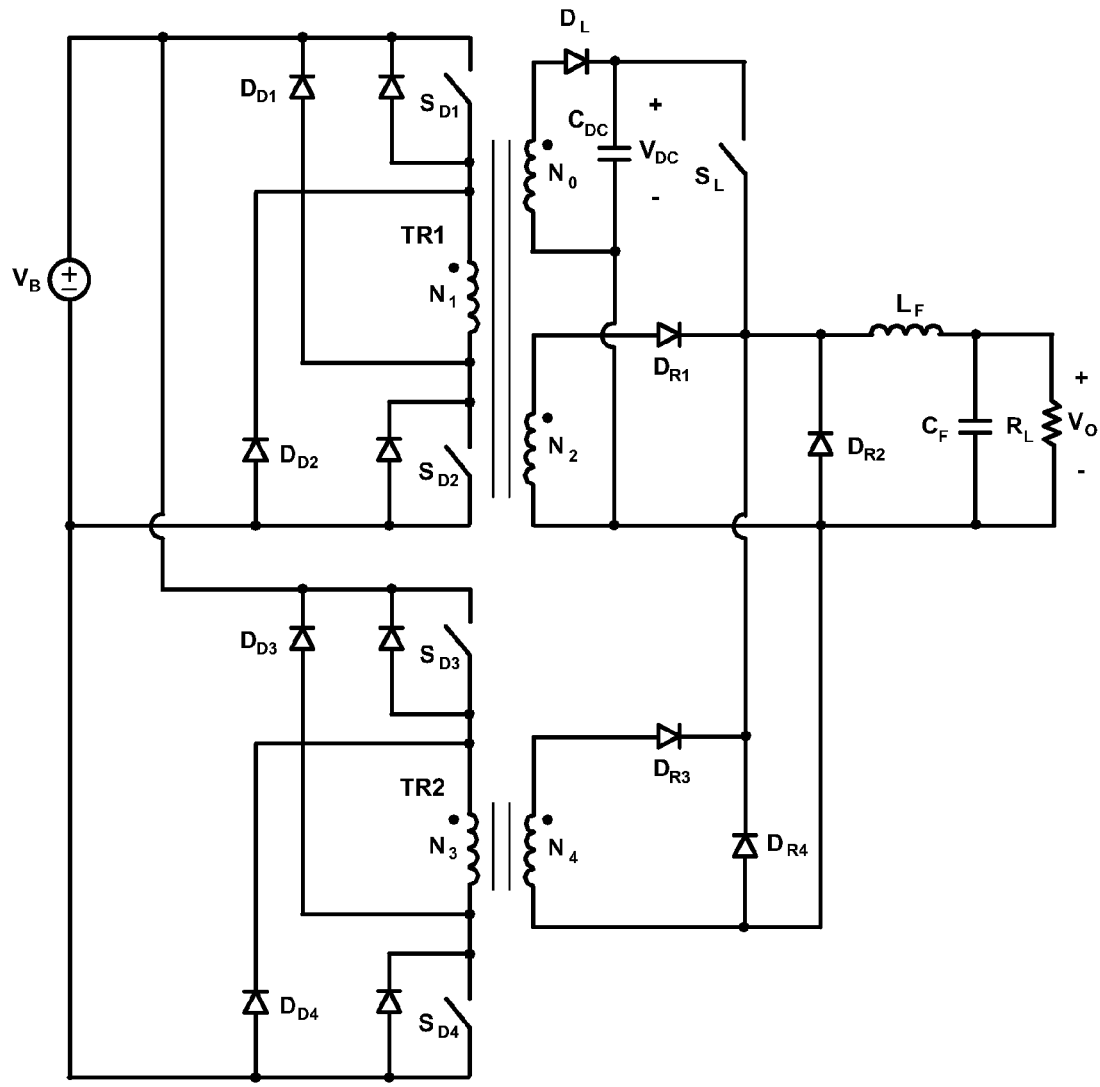
Figure 12I:
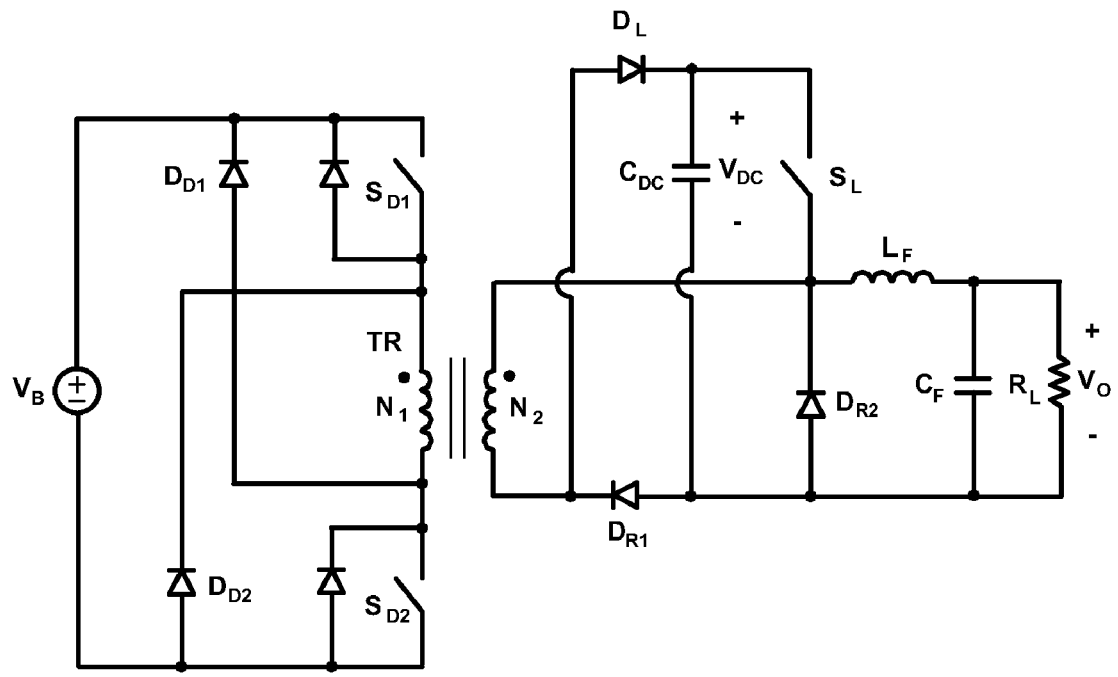

FIGS. 12(a)-(i) show implementations of a two-switch forward dc/dc converter for embodiments with the independent power storage system connected at the input of the output filter. In one exemplary embodiment, the two-switch forward dc/dc converter comprises switch $S_{D1}$, switch $S_{D2}$, diode $D_{D1}$, diode $D_{D2}$, diode $D_{R1}$, diode $D_{R2}$, transformer TR, inductor $L_F$, and capacitor $C_F$. FIG. 12(a) shows common charging and discharging path employing a bidirectional buck/boost converter. In one exemplary embodiment, the bidirectional buck/boost converter comprises boost switch $S_{L1}$, buck switch $S_{L2}$, inductor $L_L$, and capacitor $C_L$. FIG. 12(b) shows separate charging and discharging paths with charging power supplied from the output of the power stage and employing a boost converter for charging and a buck converter for discharging, where the buck converter and the power converter share the output filter. In one exemplary embodiment, the boost converter comprises boost switch $S_{L1}$, boost diode $D_L$, inductor $L_L$, and capacitor $C_L$. The buck converter comprises buck switch $S_{L2}$, power-stage diode $D_{R2}$, inductor $L_F$, and capacitor $C_F$. FIG. 12(c) shows separate charging and discharging paths with charging power supplied from the output of the power converter and employing a boost converter for charging and a buck converter for discharging, where the buck converter and the power converter share the output filter. In one exemplary embodiment, the boost converter comprises boost switch $S_{L1}$, boost diode $D_L$, inductor $L_L$, and capacitor $C_L$. The buck converter comprises buck switch $S_{L2}$, power-stage diode $D_{R2}$, inductor $L_F$, and capacitor $C_F$. FIG. 12(d) shows separate charging and discharging paths with charging power supplied directly from a second output of the power stage with a capacitor filter and employing a buck converter for discharging, where the buck converter and the power converter share the output filter. In one exemplary embodiment, the buck converter comprises buck switch $S_L$, power-stage diode $D_{R2}$, inductor $L_F$, and capacitor $C_F$. FIG. 12(e) shows separate charging and discharging paths with charging power supplied directly from a second output of the power stage with a L-C filter and employing a buck converter for discharging, where the buck converter and the power converter share the output filter. In one exemplary embodiment, the buck converter comprises buck switch $S_L$, power-stage diode $D_{R2}$, inductor $L_F$, and capacitor $C_F$. FIG. 12(f) shows separate charging and discharging paths with charging power supplied directly from a third output of the power stage and employing two buck converters for discharging, where each buck converter and its coupled power converter share the output filter. In one exemplary embodiment, the first buck converter comprises buck switch $S_{L1}$, power-stage diode $D_{R2}$, inductor $L_{F1}$, and capacitor $C_{F1}$. The second buck converter comprises buck switch $S_{L2}$, power-stage diode $D_{R4}$, inductor $L_{F2}$, and capacitor $C_{F2}$. FIG. 12(g) shows common charging and discharging path employing a bidirectional buck/boost converter coupled to two power supplies in parallel. In one exemplary embodiment, the bidirectional buck/boost converter comprises boost switch $S_{L1}$, buck switch $S_{L2}$, inductor $L_L$, and capacitor $C_L$. FIG. 12(h) shows separate charging and discharging paths with charging power supplied directly from a second output of the first power stage with a capacitor filter and employing a buck converter for discharging, where the buck converter and the two paralleled power converters share the output filter. In one exemplary embodiment, the buck converter comprises buck switch $S_L$, power-stage diode $D_{R2}$, inductor $L_F$, and capacitor $C_F$. FIG. 12(i) shows separate charging and discharging paths with charging power supplied from transformer TR and employing a buck converter for discharging, where the buck converter and the power converter share the output filter. In one exemplary embodiment, the buck converter comprises buck switch $S_L$, power-stage diode $D_{R2}$, inductor $L_F$, and capacitor $C_F$.

Figure 13A:
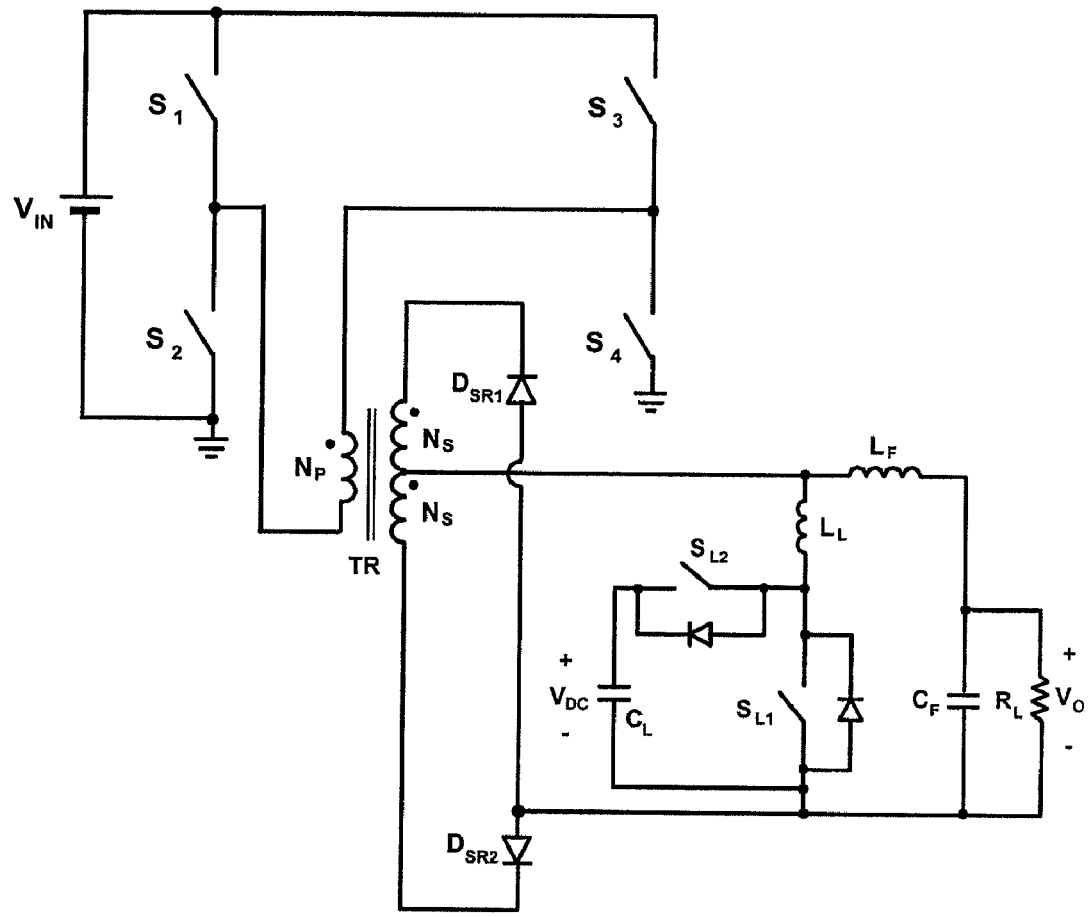
FIGS. 13(a)-(h) show implementations of a full-bridge dc/dc converter for embodiments with the independent power storage system connected at the input of the output filter.
Figure 13B:
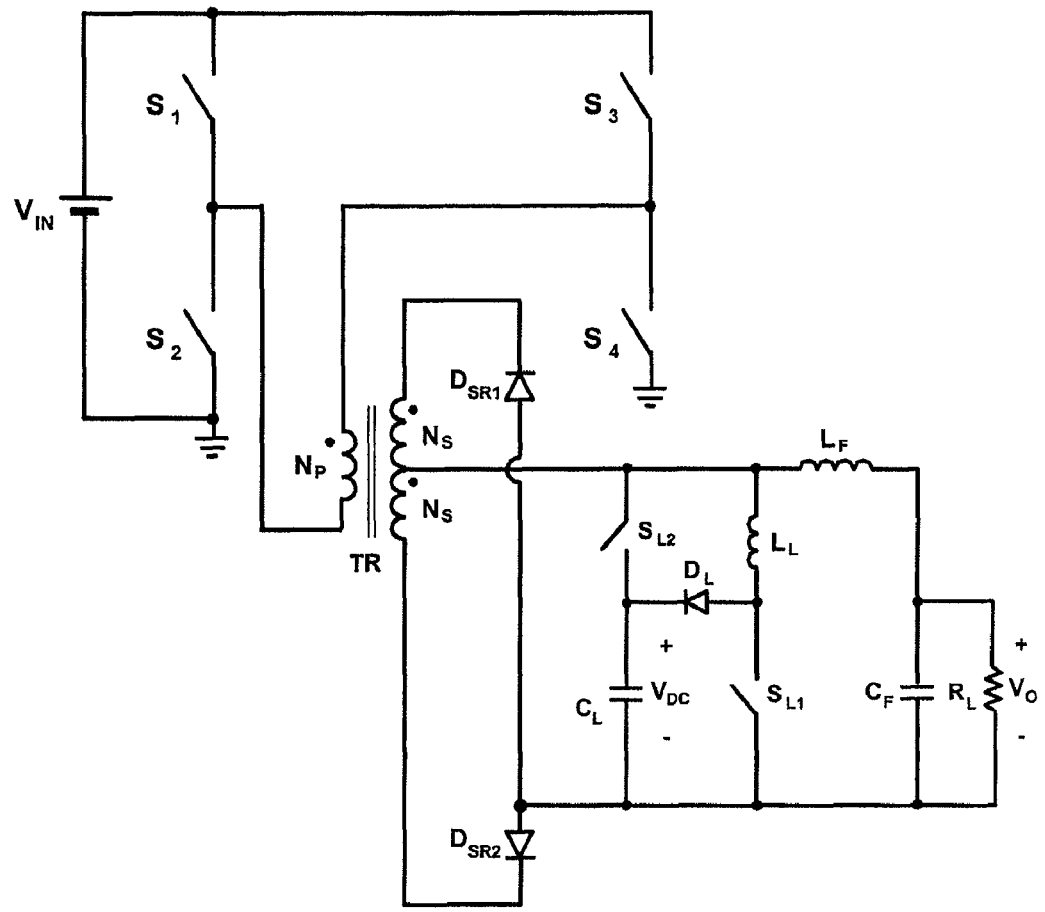
Figure 13C:
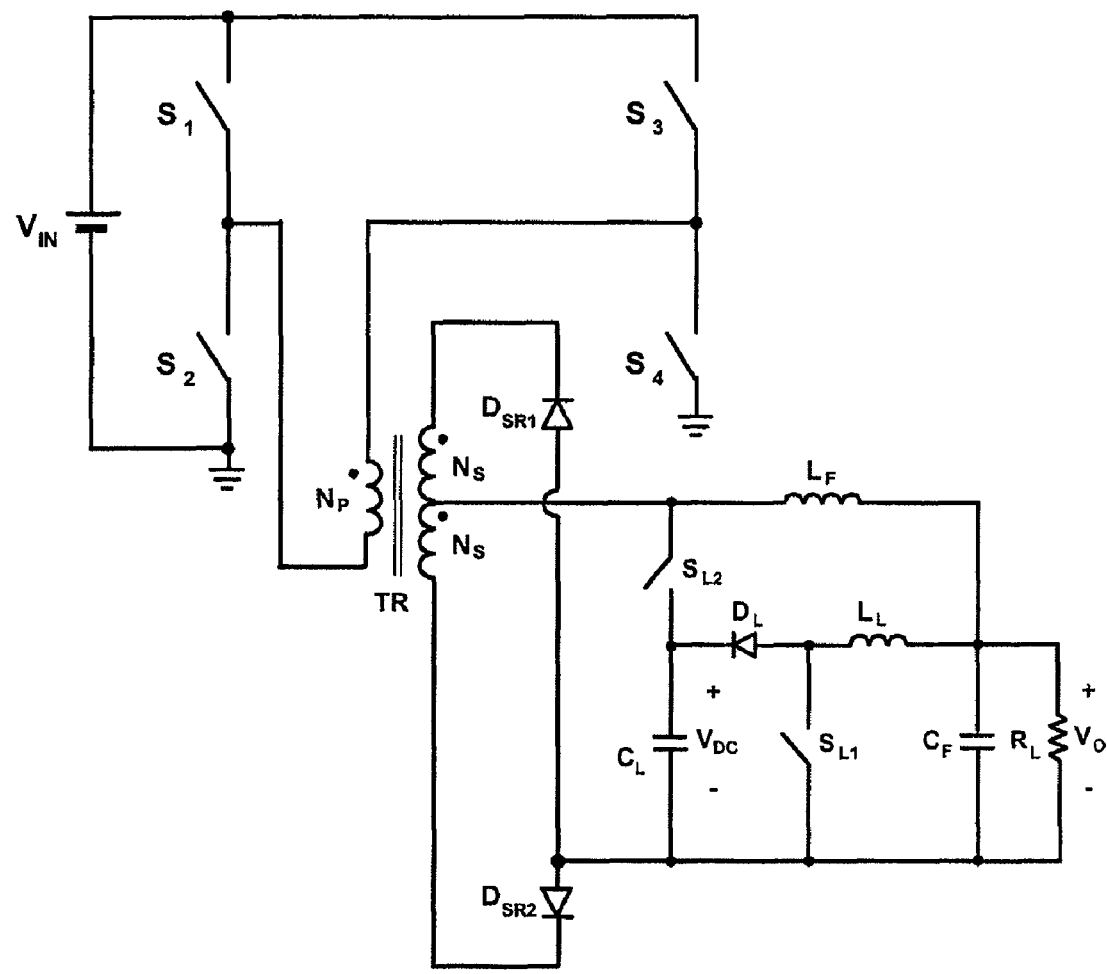
Figure 13D:
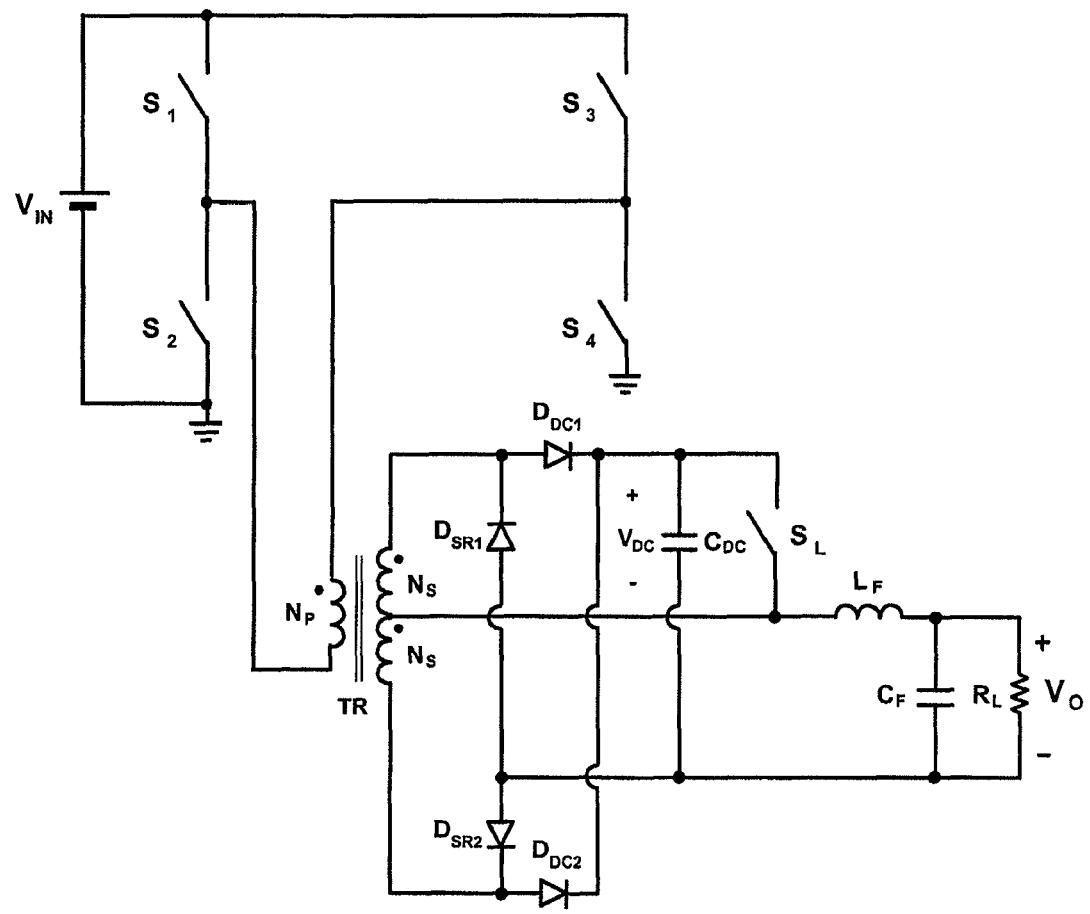
Figure 13E:
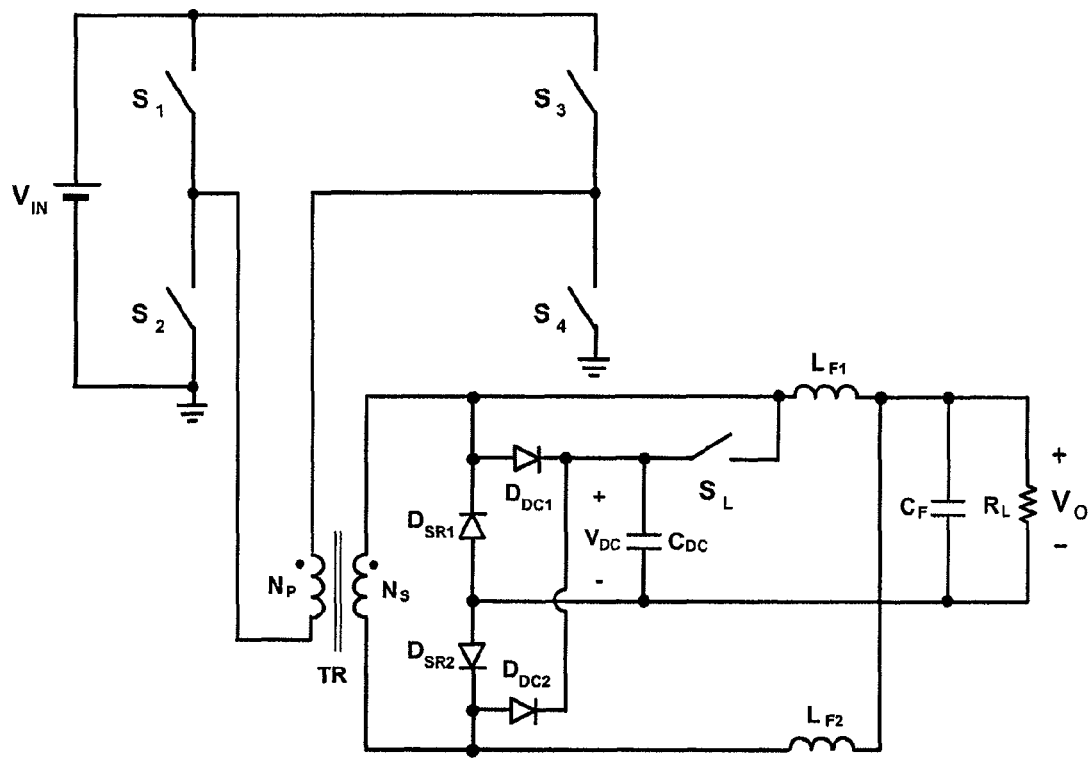
Figure 13F:
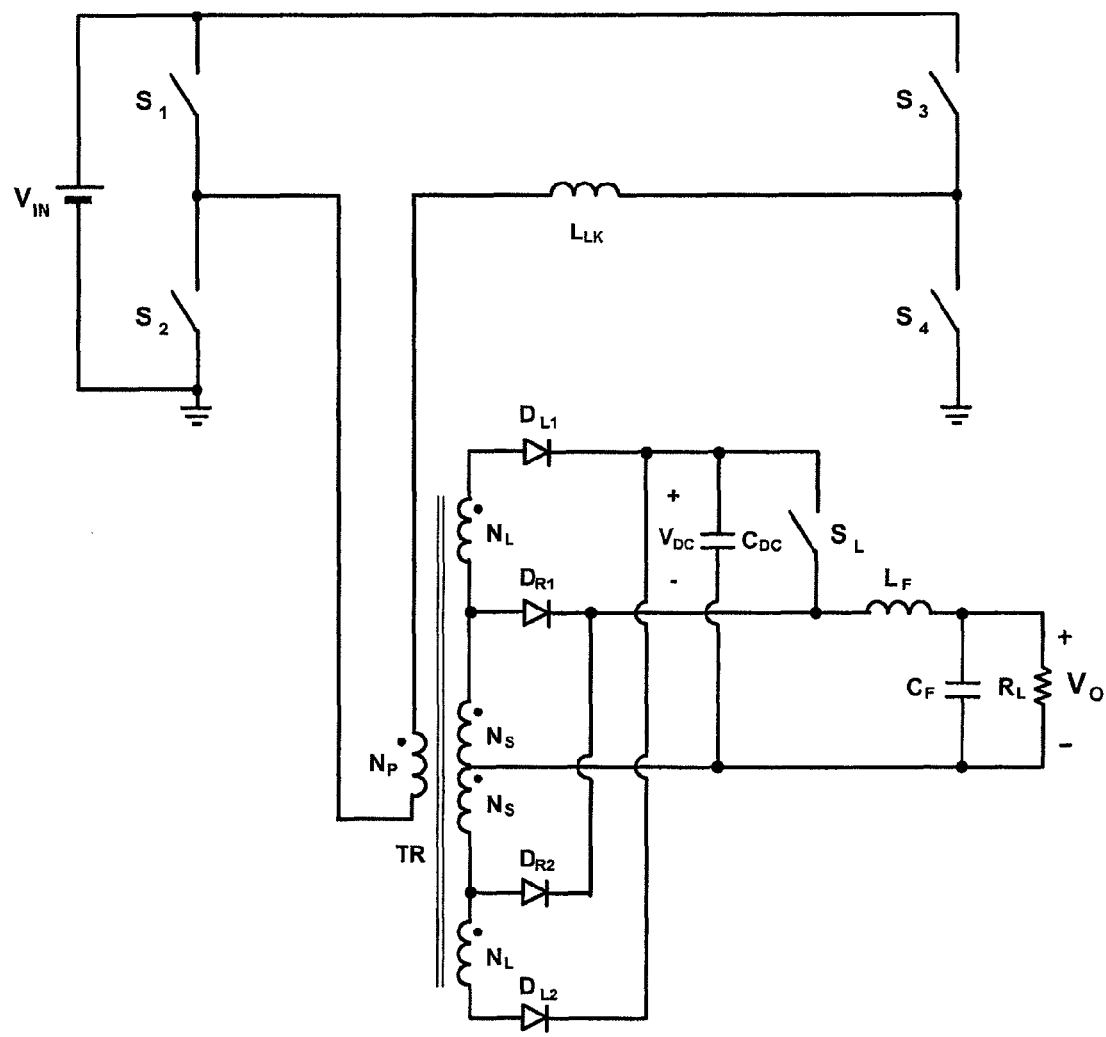
Figure 13G:
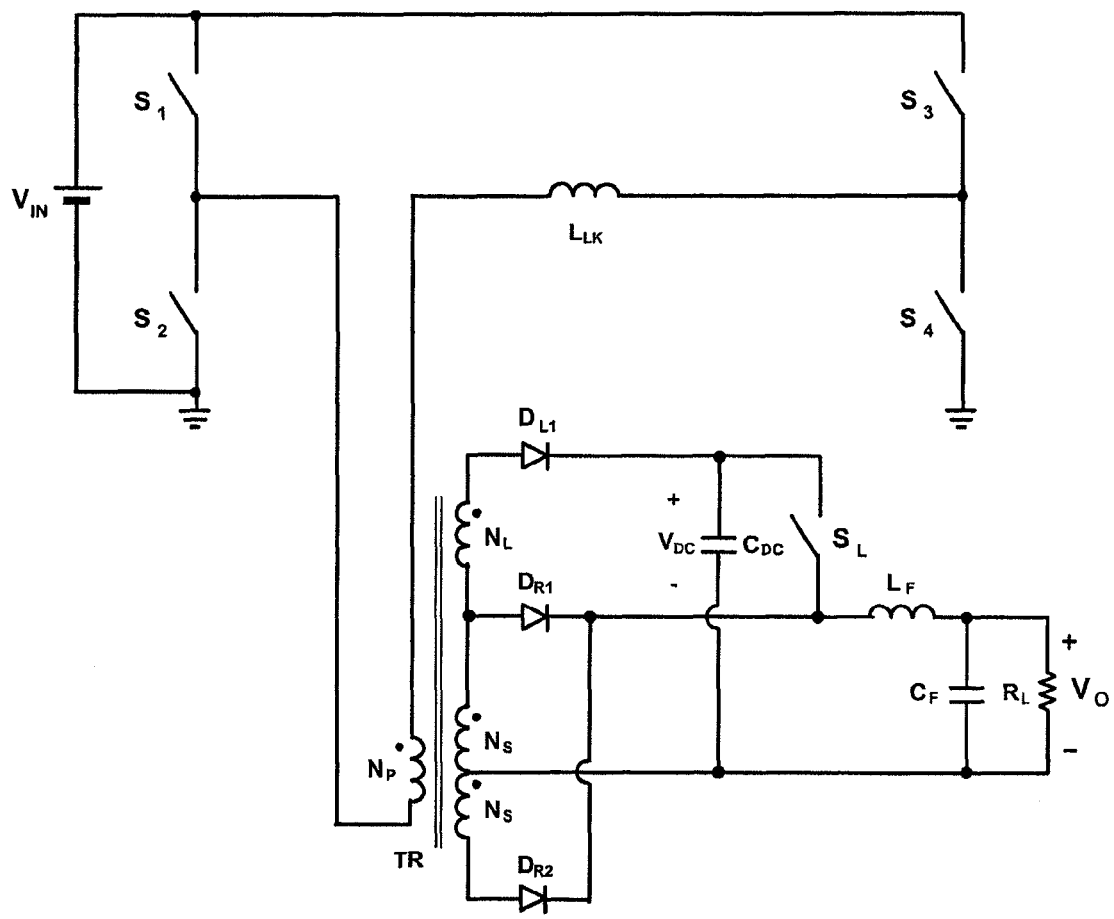
Figure 13H:
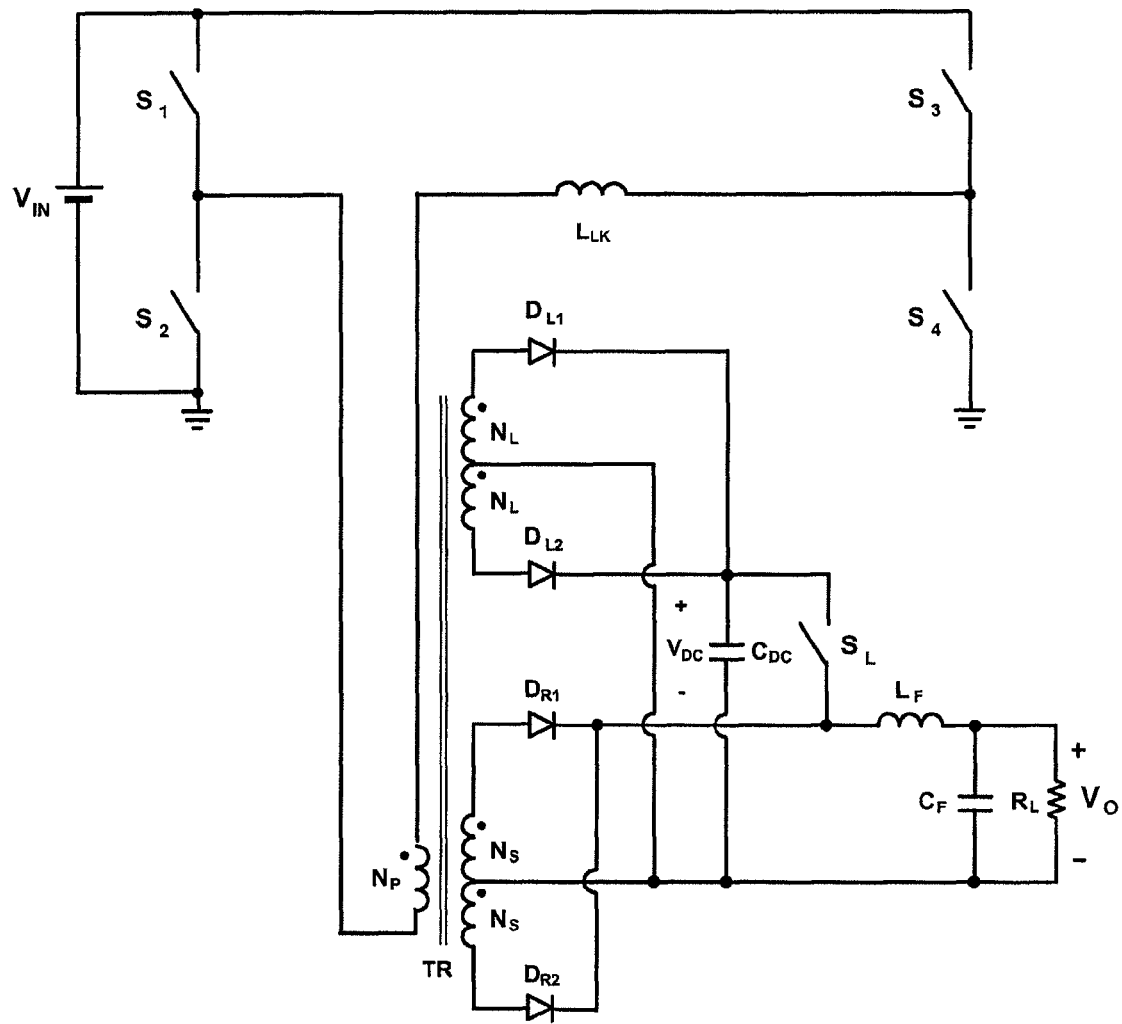

FIGS. 13(a)-(h) show implementations of a full-bridge dc/dc converter for embodiments with the independent power storage system connected at the input of the output filter. In one exemplary embodiment, the full-bridge dc/dc converter comprises switches $S_1$-$S_4$, diode $D_{SR1}$, diode $D_{SR2}$, center-tap transformer TR, inductor $L_F$, and capacitor $C_F$. In another exemplary embodiment, the full-bridge dc/dc converter comprises switches $S_1$-$S_4$, diode $D_{SR1}$, diode $D_{SR2}$, current-doubler transformer TR, inductor $L_{F1}$, inductor $L_{F2}$, and capacitor $C_F$. FIG. 13(a) shows common charging and discharging path employing a bidirectional buck/boost converter. In one exemplary embodiment, the bidirectional buck/boost converter comprises boost switch $S_{L1}$, buck switch $S_{L2}$, inductor $L_L$, and capacitor $C_L$. FIG. 13(b) shows separate charging and discharging paths with charging power supplied from the output of the power stage and employing a boost converter for charging and a buck converter for discharging, where the buck converter and the power converter share the output filter. In one exemplary embodiment, the boost converter comprises boost switch $S_{L1}$, boost diode $D_L$, inductor $L_L$, and capacitor $C_L$. The buck converter comprises buck switch $S_{L2}$, power-stage diode $D_{SR1}$, power-stage diode $D_{SR2}$, inductor $L_F$, and capacitor $C_F$. FIG. 13(c) shows separate charging and discharging paths with charging power supplied from the output of the power stage and employing a boost converter for charging and a buck converter for discharging, where the buck converter and the power converter share the output filter. In one exemplary embodiment, the boost converter comprises boost switch $S_{L1}$, boost diode $D_L$, inductor $L_L$, and capacitor $C_L$. The buck converter comprises buck switch $S_{L2}$, power-stage diode $D_{SR1}$, power-stage diode $D_{SR2}$, inductor $L_F$, and capacitor $C_F$. FIG. 13(d) shows separate charging and discharging paths with charging power supplied directly from the secondary winding of center-tap transformer (TR) and employing a buck converter for discharging, where the buck converter and the power converter share the output filter. In one exemplary embodiment, the buck converter comprises buck switch $S_L$, power-stage diode $D_{SR1}$, power-stage diode $D_{SR2}$, inductor $L_F$, and capacitor $C_F$. FIG. 13(e) shows separate charging and discharging paths with charging power supplied directly from the secondary winding of current-doubler transformer (TR) and employing a buck converter for discharging, where the buck converter and the power converter share the output filter. In one exemplary embodiment, the buck converter comprises buck switch $S_L$, power-stage diode $D_{SR1}$, inductor $L_{F1}$, and capacitor $C_F$. FIG. 13(f) shows separate charging and discharging paths with charging power supplied directly from additional secondary windings of center-tap transformer (TR) and employing a buck converter for discharging, where the buck converter and the power converter share the output filter. In one exemplary embodiment, the buck converter comprises buck switch $S_L$, power-stage diode $D_{R1}$, power-stage diode $D_{R2}$, inductor $L_F$, and capacitor $C_F$. FIG. 13(g) shows separate charging and discharging paths with charging power supplied directly from a second output of the power stage and employing a buck converter for discharging, where the buck converter and the power converter share the output filter. In one exemplary embodiment, the buck converter comprises buck switch $S_L$, power-stage diode $D_{R1}$, power-stage diode $D_{R2}$, inductor $L_F$, and capacitor $C_F$. FIG. 13(h) shows separate charging and discharging paths with charging power supplied directly from a second output with center-tap winding and employing a buck converter for discharging, where the buck converter and the power converter share the output filter. In one exemplary embodiment, the buck converter comprises buck switch $S_L$, power-stage diode $D_{R1}$, power-stage diode $D_{R2}$, inductor $L_F$, and capacitor $C_F$.

Figure 14:
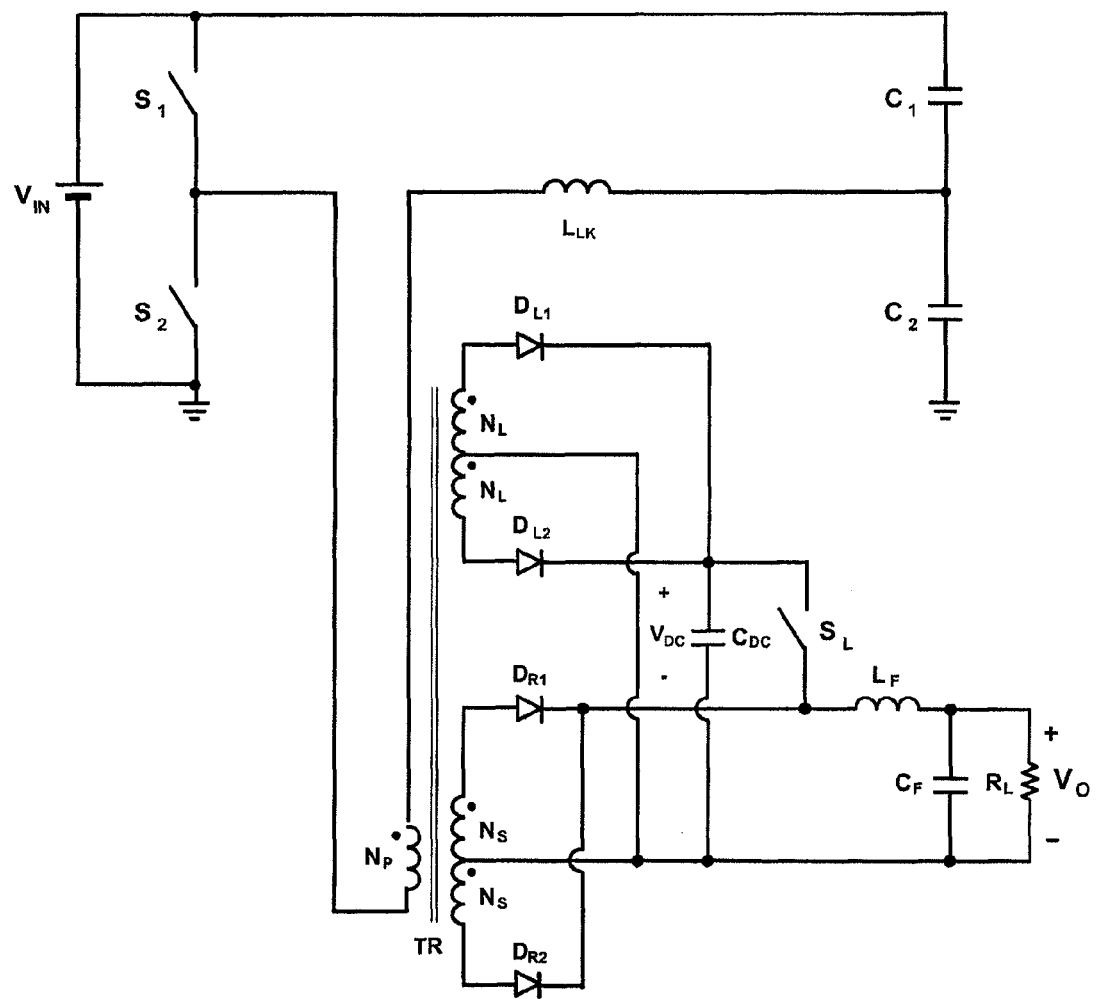
FIG. 14 shows implementations of a half-bridge dc/dc converter for embodiments with the independent power storage system.

FIG. 14 shows implementations of a half-bridge dc/dc converter for embodiments with the independent power storage system connected at the input of the output filter with separate charging and discharging paths with charging power supplied directly from a second output of the power stage and employing a buck converter for discharging, where the buck converter and the power converter share the output filter. In one exemplary embodiment, the half-bridge dc/dc converter comprises switch $S_1$, switch $S_2$, capacitor $C_1$, capacitor $C_2$, diode $D_{R1}$, diode $D_{R2}$, transformer TR, inductor $L_F$, and capacitor $C_F$. The buck converter comprises buck switch $S_L$, power-stage diode $D_{R1}$, power-stage diode $D_{R2}$, inductor $L_F$, and capacitor $C_F$.

Figure 15A:
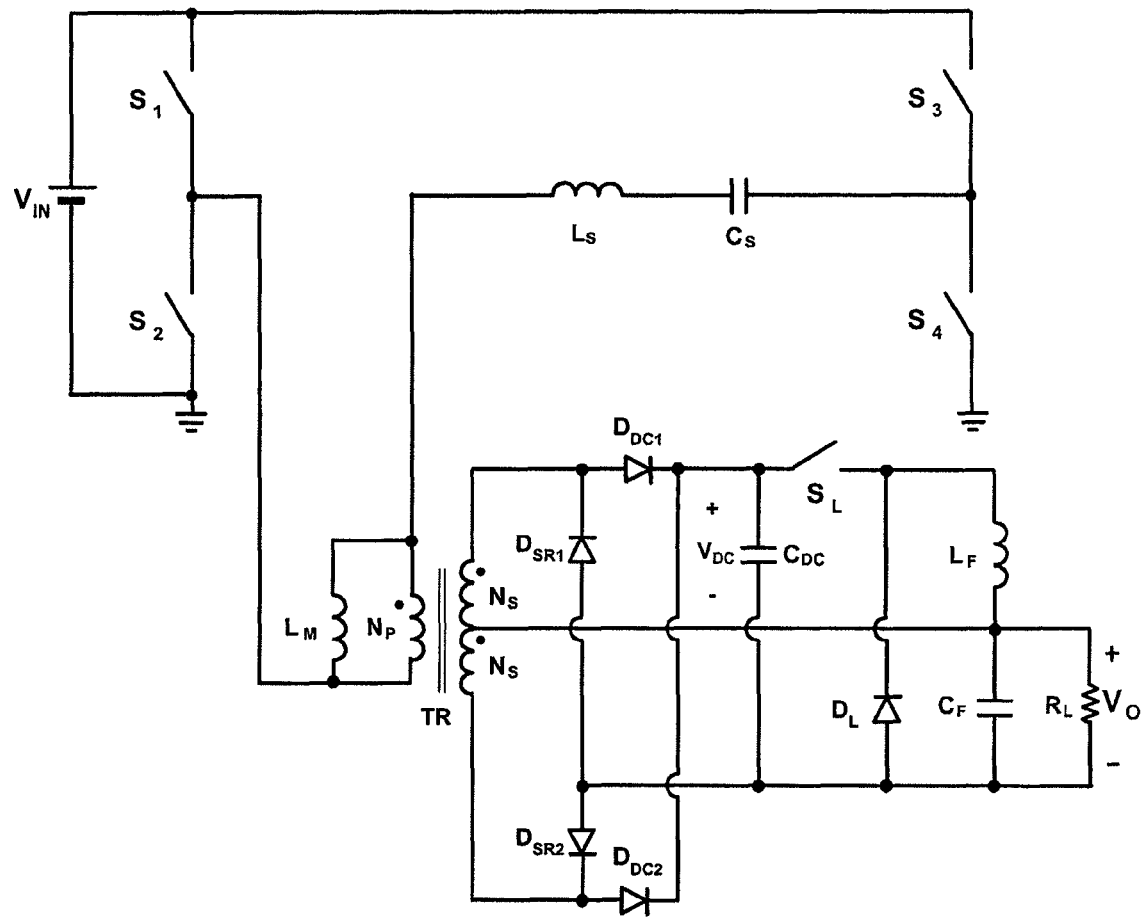
FIGS. 15(a)-(c) show implementations of a LLC resonant dc/dc converter for embodiments with the independent power storage system connected at the input of the output filter.
Figure 15B:
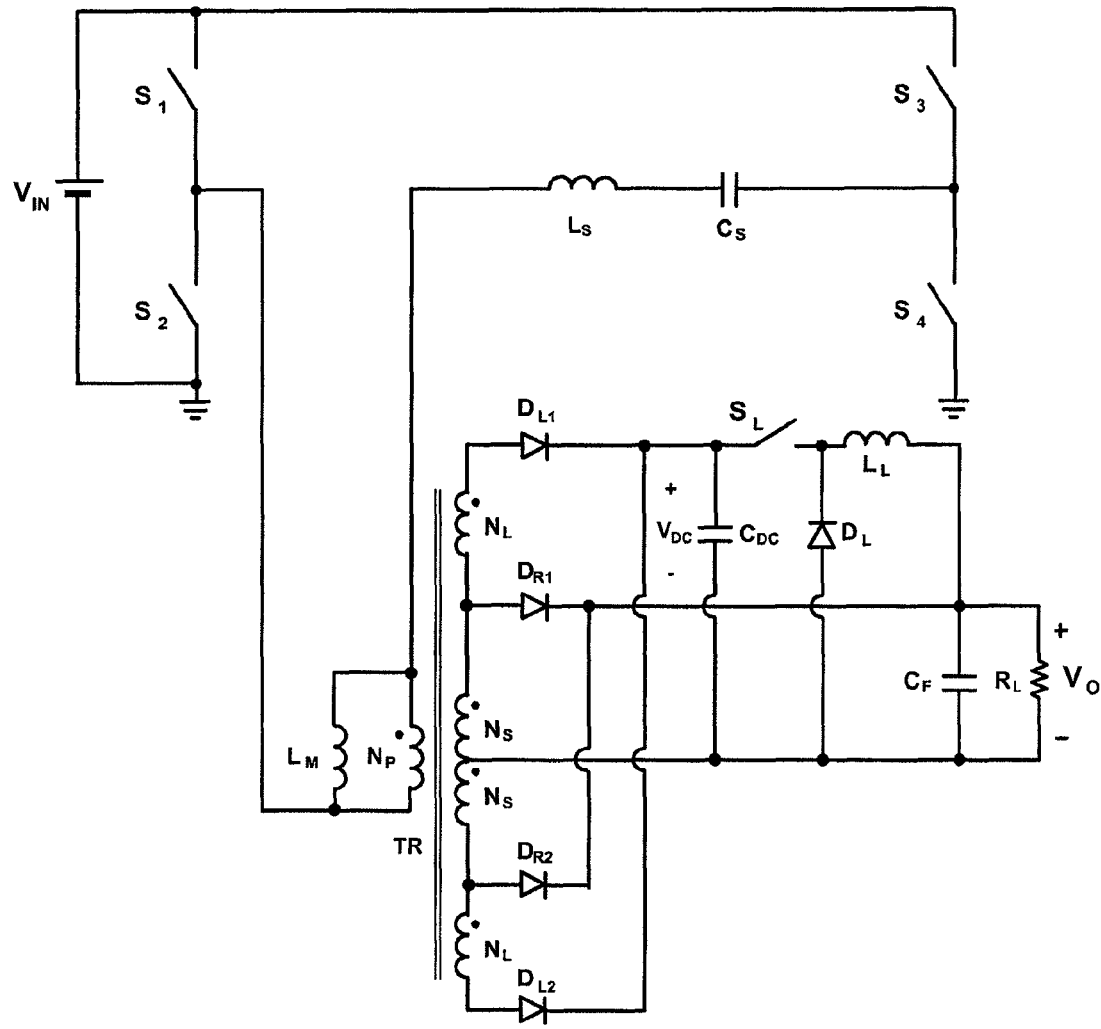
Figure 15C:
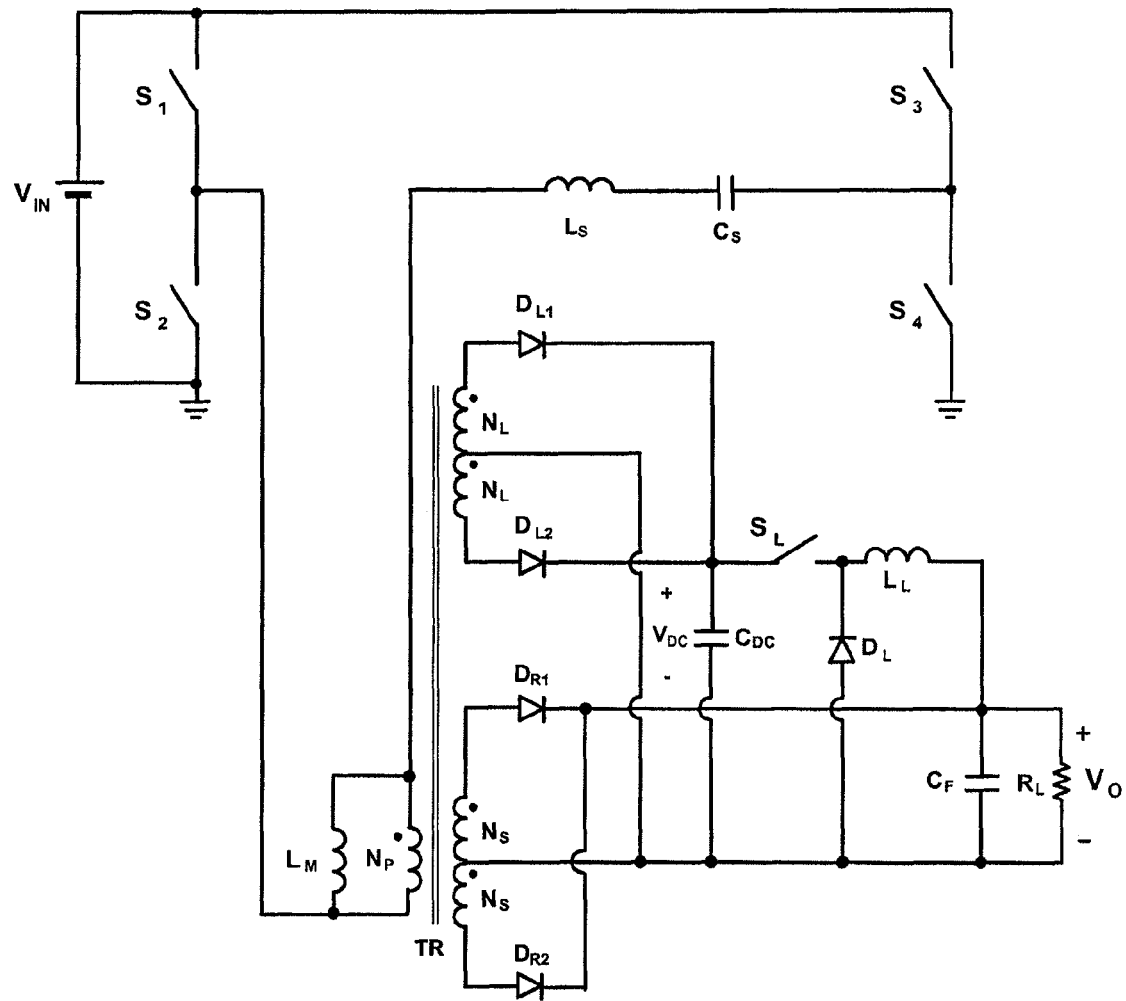

FIGS. 15(a)-(c) show implementations of a LLC resonant dc/dc converter for embodiments with the independent power storage system connected at the input of the output filter. In one exemplary embodiment, the LLC resonant dc/dc converter comprises switches $S_1$-$S_4$, series resonant inductor $L_S$, parallel resonant inductor LM, resonant capacitor $C_S$, diode $D_{SR1}$, diode $D_{SR2}$, transformer TR, and capacitor $C_F$. FIG. 15(a) shows separate charging and discharging paths with charging power supplied directly from the secondary winding of center-tap transformer (TR) and employing a buck converter for discharging, where the buck converter and the power converter share the output filter. In one exemplary embodiment, the buck converter comprises buck switch $S_L$, buck diode $D_L$, inductor $L_F$, and capacitor $C_F$. FIG. 15(b) shows separate charging and discharging paths with charging power supplied directly from additional secondary windings of center-tap transformer (TR) and employing a buck converter for discharging, where the buck converter and the power converter share the output filter. In one exemplary embodiment, the buck converter comprises buck switch $S_L$, buck diode $D_L$, inductor $L_L$, and capacitor $C_F$. FIG. 15(c) shows separate charging and discharging paths with charging power supplied directly from a second output of the power converter and employing a buck converter for discharging, where the buck converter and the power converter share the output filter. In one exemplary embodiment, the buck converter comprises buck switch $S_L$, buck diode $D_L$, inductor $L_L$, and capacitor $C_F$.

Figure 16:
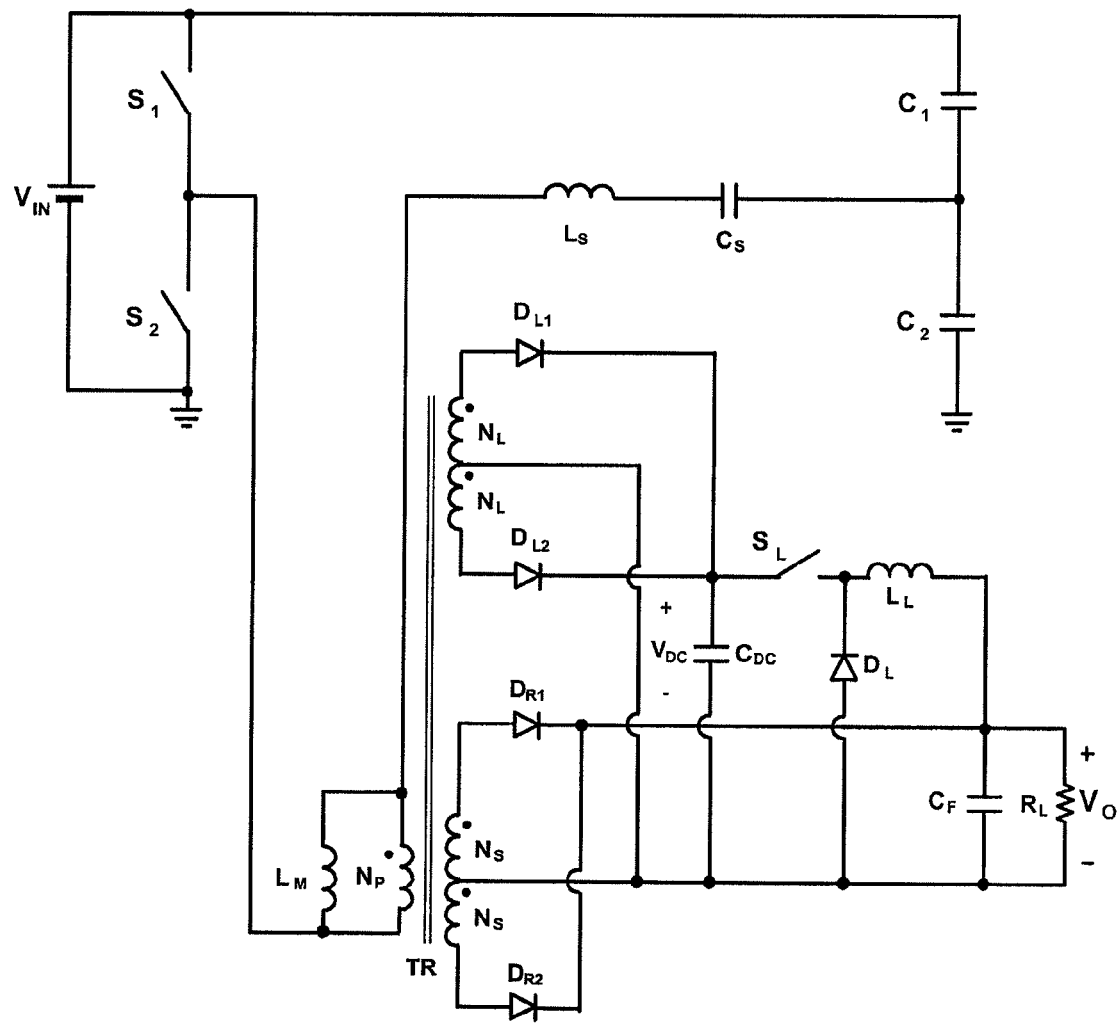
FIG. 16 shows implementations of a half-bridge LLC resonant dc/dc converter.

FIG. 16 shows implementations of a half-bridge LLC resonant dc/dc converter for embodiments with the independent power storage system connected at the input of the output filter with separate charging and discharging paths with charging power supplied directly from a second output of the power converter and employing a buck converter for discharging, where the buck converter and the power converter share the output filter. In one exemplary embodiment, the half-bridge LLC resonant dc/dc converter comprises switches $S_1$-$S_2$, capacitors $C_1$-$C_2$, series resonant inductor $L_S$, parallel resonant inductor LM, resonant capacitor $C_S$, diode $D_{R1}$, diode $D_{R2}$, transformer TR, and capacitor $C_F$. The buck converter comprises buck switch $S_L$, buck diode $D_L$, inductor $L_L$, and capacitor $C_F$.

Figure 17A:
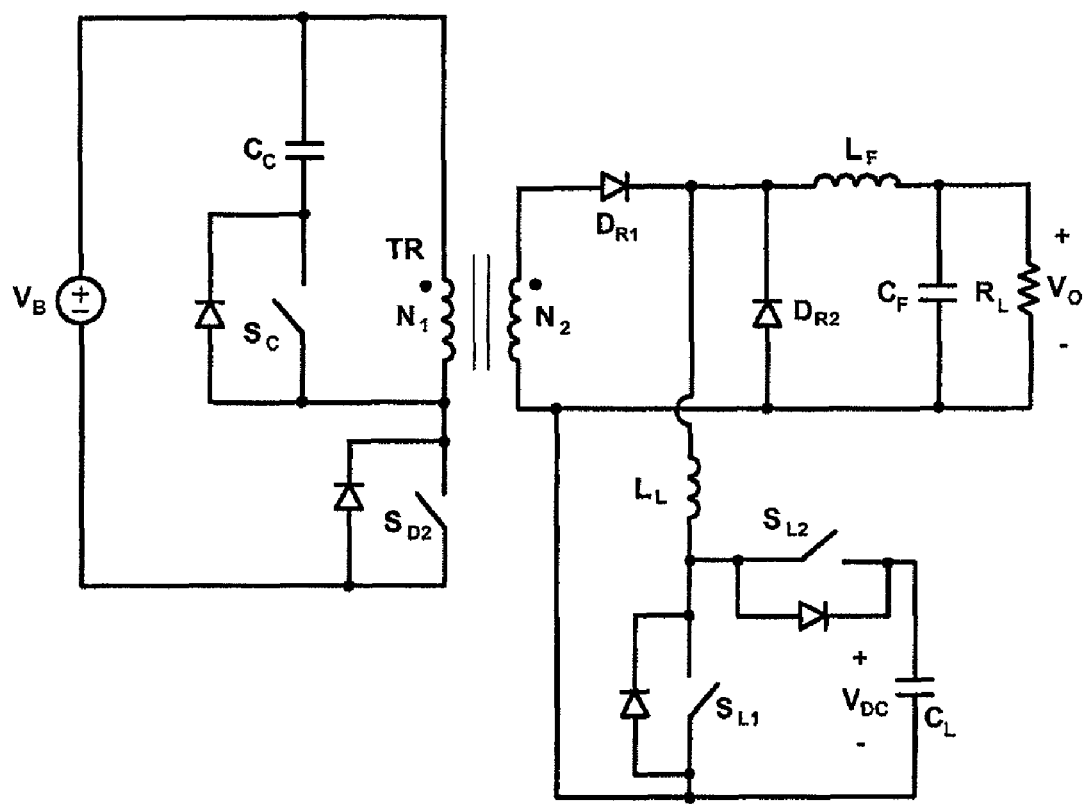
FIGS. 17(a)-(b) show implementations of a forward dc/dc converter for embodiments with the independent power storage system connected at the input of the output filter.
Figure 17B:
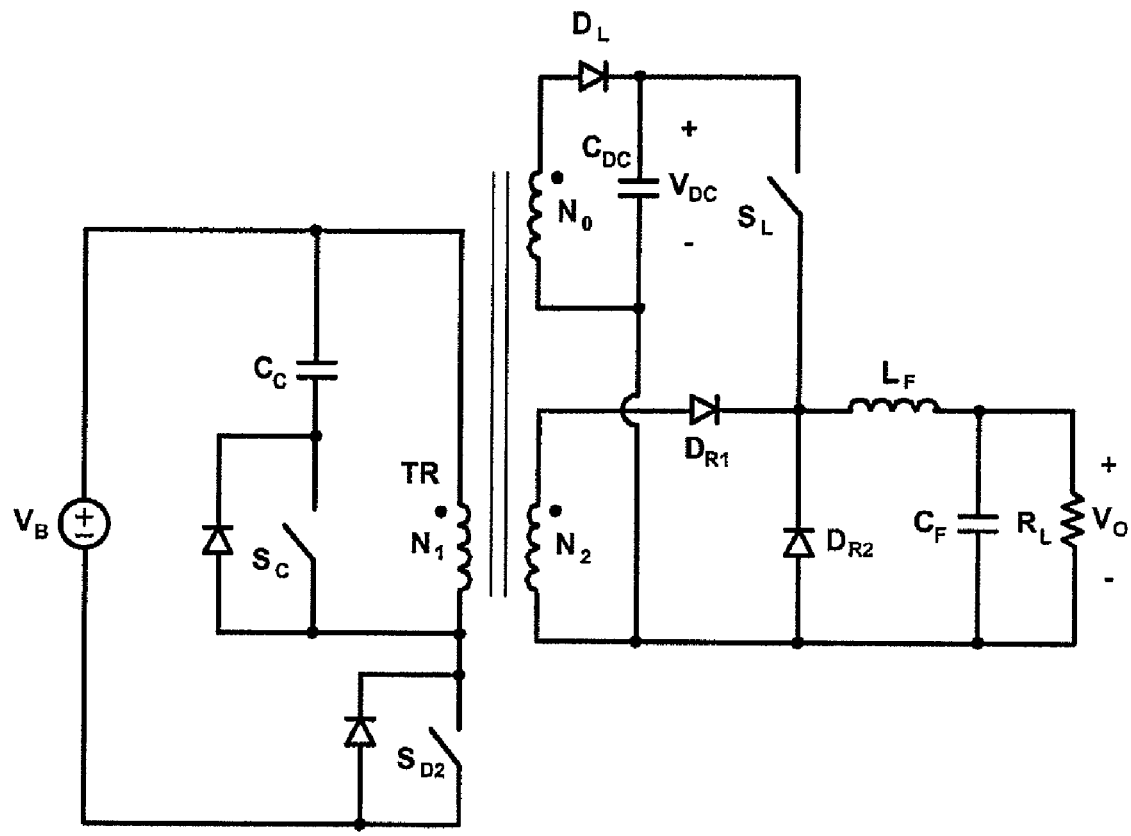

FIGS. 17(a)-(b) show implementations of a forward dc/dc converter for embodiments with the independent power storage system connected at the input of the output filter. In one exemplary embodiment, the forward dc/dc converter comprises switch $S_{D2}$, clamp switch $S_C$, clamp capacitor $C_C$, diode $D_{R1}$, diode $D_{R2}$, transformer TR, inductor $L_F$, and capacitor $C_F$. FIG. 17(a) shows common charging and discharging path employing a bidirectional buck/boost converter. In one exemplary embodiment, the bidirectional buck/boost converter comprises boost switch $S_{L1}$, buck switch $S_{L2}$, inductor $L_L$, and capacitor $C_L$. FIG. 17(b) shows separate charging and discharging paths with charging power supplied directly from a second output of the power stage and employing a buck converter for discharging, where the buck converter and the power converter share the output filter. In one exemplary embodiment, the buck converter comprises buck switch $S_L$, power-stage diode $D_{R2}$, inductor $L_F$, and capacitor $C_F$.

Figure 18:
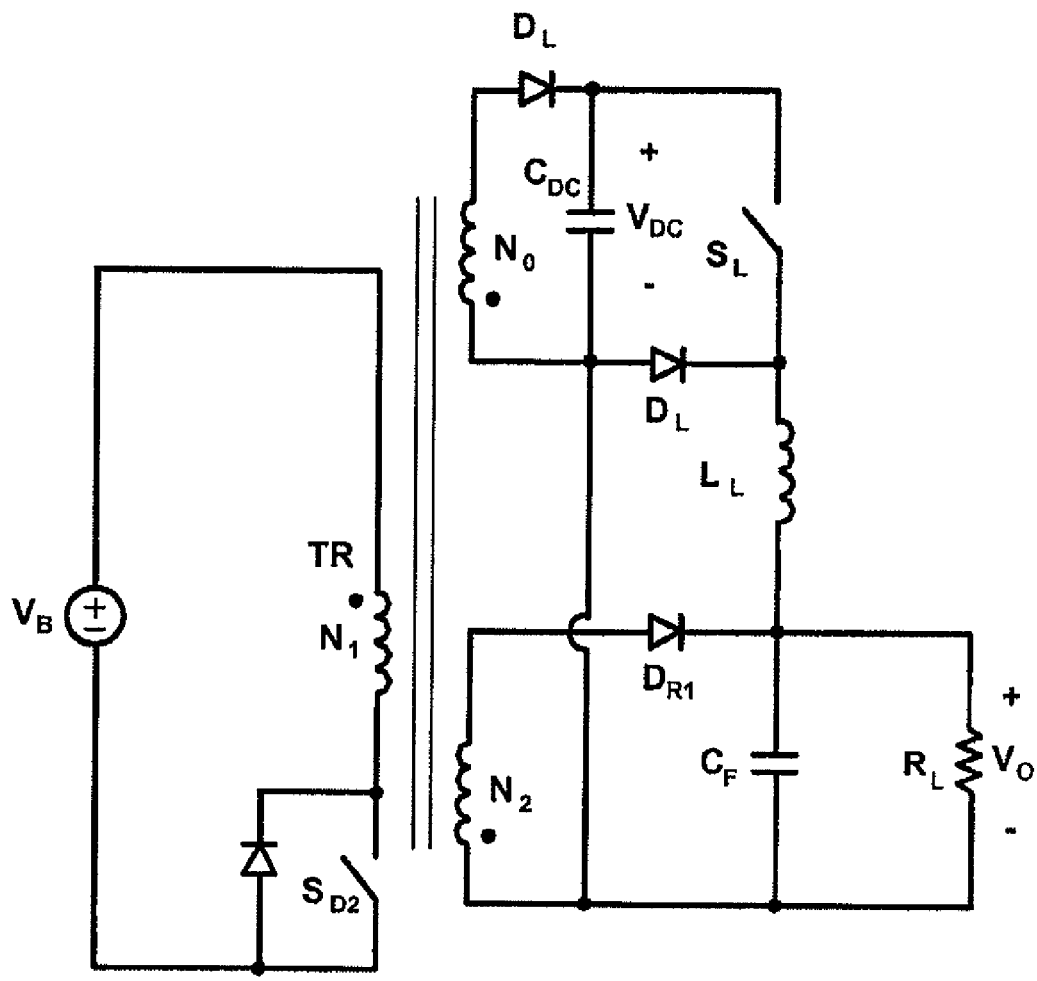
FIG. 18 shows implementations of a flyback dc/dc converter with separate charging and discharging paths.

FIG. 18 shows implementations of a flyback dc/dc converter with separate charging and discharging paths with charging power supplied directly from a second output of the power stage and employing a buck converter for discharging. In one exemplary embodiment, the flyback dc/dc converter comprises switch $S_{D2}$, diode $D_{R1}$, transformer TR, and capacitor $C_F$. The buck converter comprises buck switch $S_L$, buck diode $D_L$, inductor $L_L$, and capacitor $C_F$.

Figure 19A:
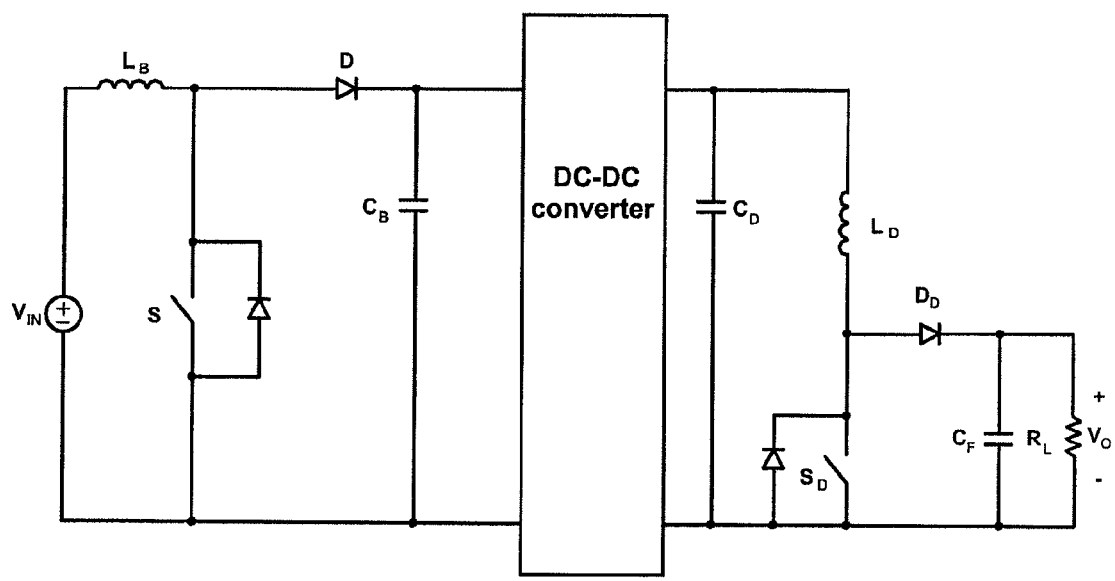
FIGS. 19(a) and (b) show implementations of a three-stage ac/dc converter for the embodiment of the present invention with the independent power storage system in series with the power converter.

FIGS. 19(a) and (b) show implementations of a three-stage ac/dc converter for the embodiment of the present invention with the independent power storage system in series with the power converter. In one exemplary embodiment, the three-stage ac/dc converter comprises a boost PFC rectifier, an isolation dc/dc power converter, and a boost dc/dc converter. FIG. 19(a) comprises boost PFC followed by an isolation dc/dc power converter and a boost discharging output stage.

Figure 19B:
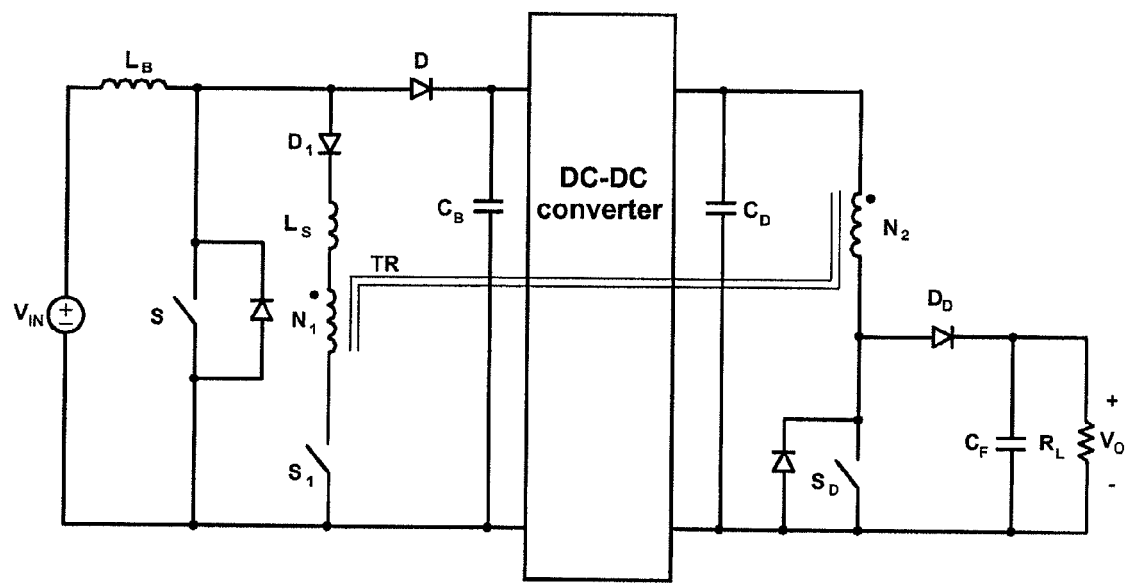

In one exemplary embodiment, the boost PFC comprises boost switch S, boost diode D, boost inductor $L_B$, and bulk capacitor $C_B$. The boost discharging output stage comprises boost switch $S_D$, boost diode $D_D$, boost inductor $L_D$, and output capacitor $C_F$. FIG. 19(b) comprises boost PFC followed by an isolation dc/dc power converter and a boost discharging output stage with magnetic coupling between the input PFC stage and output boost stage. In one exemplary embodiment, the boost PFC comprises boost switch S, boost diode D, boost inductor $L_B$, snubber diode $D_1$, snubber inductor $L_S$, snubber switch $S_1$, primary winding $N_1$ of gapped transformer TR, and bulk capacitor $C_B$. The boost discharging output stage comprises boost switch $S_D$, boost diode $D_D$, secondary winding $N_2$ of gapped transformer TR, and output capacitor $C_F$.

The invention claimed is:

1. A power converter system that receives an input supply voltage to power at least one load, comprising:
at least one power converter operating at a desired efficiency;
a power storage system coupled to the at least one power converter for receiving power supplied from the at least one power converter and storing power therein; and
a controller that turns on the power converter during a first time interval and turns off the power converter during a second time interval any time the at least one power converter operates at an efficiency that is below the desired efficiency while the power converter receives the input supply voltage, wherein during the first time interval, the power converter operates at the desired efficiency to supply power to the power storage system and the at least one load, and wherein during the second time interval when the at least one power converter is turned off, the power storage system supplies power to the at least one load, wherein the ratio of the first time interval and the second time interval is controlled to operate the power converter at the desired efficiency.

2. The power converter system of claim 1, wherein the at least one power converter has a first output for supplying power to the power storage system during the first time interval and a second output for supplying power to the at least one load.

3. The power converter system of claim 1, wherein the at least one power converter has a single output for supplying power to the power storage system during the first time interval and supplying power to the at least one load.

4. The power converter system of claim 1, wherein the power storage system has a single port for receiving supply of power from the at least one power converter during the first time interval and supplying power to the at least one load during the second time interval.

5. The power converter system of claim 1, wherein the power storage system has a first port for receiving supply of power from the at least one power converter during the first time interval and a second port for supplying power to the at least one load during the second time interval.

6. The power converter system of claim 1, wherein the at least one power converter comprises a power stage and an output filter, wherein the power storage system supplies power to the at least one load via the output filter.

7. The power converter system of claim 1, wherein the at least one power converter supplies power to the power storage system via an output filter.

8. The power converter system of claim 1, wherein the power converter, the power storage system and the load are coupled in series.

9. The power converter system of claim 1, wherein the power converter comprises at least one of isolated, non-isolated, single-stage and multi-stage, ac/dc, dc/dc, dc/ac, and ac/ac power converter.

10. The power converter system of claim 9, wherein the dc/dc power converter comprises at least one of two-switch forward dc/dc power converter, full-bridge dc/dc power converter, half-bridge dc/dc power converter, LLC resonant dc/dc power converter, half-bridge LLC resonant dc/dc power converter, forward dc/dc power converter, and flyback dc/dc power converter.

11. The power converter system of claim 9, wherein the ac/dc power converter comprises three-stage ac/dc converter.

12. The power converter system of claim 1, wherein the power storage system comprises at least one of battery, fuel cell, capacitor, super capacitor, thermal storage, and flywheel.

13. The power converter system of claim 1, wherein the power storage system comprises at least one of isolated, non-isolated, single-stage and multi-stage, ac/dc, dc/dc, dc/ac, and ac/ac power converter.

14. The power converter system of claim 1, wherein the power storage system comprises a temporary energy storage and power conditioning circuit.

15. The power converter system of claim 14, wherein the temporary energy storage and power conditioning circuit comprises at least one of bidirectional buck/boost converter, boost converter and buck converter, and buck discharging converter.

16. The power converter system of claim 1, further comprising a controller coupled to the at least one power converter and the power storage system for controlling the operations of the at least one power converter and the power storage system.

17. The power converter system of claim 1, wherein any time the at least one power converter operates at an efficiency that is below the desired efficiency or an efficiency threshold, the power converter operates at the desired efficiency to supply power to the power storage system and the power storage system supplies power to the at least one load simultaneously.

18. The power converter system of claim 1, wherein any time the at least one power converter operates at an efficiency that is below the desired efficiency or an efficiency threshold, the power converter operates at the desired efficiency to supply power to the power storage system and the at least one load and the power storage system supplies power to the at least one load simultaneously.

19. The power converter system of claim 1, wherein said power converter system comprises at least one of power conversion system for LED, power conversion system for solar cell, power conversion system for fuel cell, power conversion system for wind energy, power conversion system for vibrating energy, power conversion system for kinetic energy, power conversion system for thermal energy, power plant, power management and conversion system for architecture, power management and conversion system for data center, UPS, power conversion system for vehicle, power conversion system for computer or notebook, power conversion system for communication device or apparatus, power conversion system for consumer electronics product, and power conversion system for household electric appliance.

* * * * *